United States Patent [19]

Weibel

[11] Patent Number: 4,629,575
[45] Date of Patent: Dec. 16, 1986

[54] WELL DRILLING AND PRODUCTION FLUIDS EMPLOYING PARENCHYMAL CELL CELLULOSE

[75] Inventor: Michael K. Weibel, West Redding, Conn.

[73] Assignee: SBP, Inc., Philadelphia, Pa.

[21] Appl. No.: 511,393

[22] Filed: Jul. 6, 1983

Related U.S. Application Data

[63] Continuation-in-part of Ser. No. 414,931, Sep. 3, 1982, abandoned.

[51] Int. Cl.$^4$ .......................... C09K 7/02; C09K 3/00; C08L 1/00
[52] U.S. Cl. .................. 252/8.551; 252/8.553; 252/8.554; 252/8.514; 252/8.51; 252/8.512; 536/56; 536/114; 536/128; 106/163.1; 127/37; 162/99; 166/271; 166/275; 166/305.1; 166/307; 166/308; 175/65; 175/72
[58] Field of Search .............. 252/8.5 C, 8.5 A, 8.5 B, 252/8.5 LC, 8.55 R, 8.55 C, 8.55 D; 536/56, 114, 128, 127; 127/1, 37, 40; 162/99; 106/163.1; 166/271, 275, 305.1, 307, 308; 175/65, 72

[56] References Cited

U.S. PATENT DOCUMENTS

| 2,319,705 | 5/1943 | Post et al. | 252/8.55 R |
|---|---|---|---|
| 2,437,672 | 3/1948 | Anway | 252/8.55 R |
| 2,444,929 | 7/1948 | Hatch | 241/14 |
| 2,446,551 | 8/1948 | Pauley | 252/8.55 R |
| 2,582,323 | 1/1952 | Fischer | 252/8.5 A |
| 2,627,375 | 2/1953 | Grondal et al. | 241/14 |
| 2,749,309 | 6/1956 | Heritage | 252/8.55 R |
| 2,912,380 | 11/1959 | Groves | 252/8.5 |
| 3,042,608 | 6/1962 | Morris | 252/8.5 |
| 3,441,528 | 4/1969 | Dede, Jr. | 260/17.2 |
| 3,446,795 | 5/1969 | Boudreaux et al. | 260/231 |
| 3,471,402 | 10/1969 | Shannon et al. | 252/8.5 |
| 3,506,644 | 4/1970 | Parker | 260/232 |
| 3,625,889 | 12/1971 | Branscum | 252/8.5 A |
| 3,668,122 | 6/1972 | Branscum | 252/8.5 |
| 3,727,688 | 4/1973 | Clampitt | 166/283 |
| 3,788,405 | 1/1974 | Taylor | 175/72 |
| 3,852,200 | 12/1974 | Meyer | 252/8.5 |
| 3,882,029 | 5/1975 | Fischer et al. | 252/8.55 R |
| 3,954,628 | 5/1976 | Sauber et al. | 252/8.5 |
| 4,043,921 | 8/1977 | Hessert et al. | 252/8.5 |
| 4,068,720 | 1/1978 | Hessert et al. | 166/282 |
| 4,082,677 | 4/1978 | Zollar et al. | 252/8.5 B |
| 4,088,583 | 5/1978 | Pyle et al. | 252/8.5 A |
| 4,096,074 | 6/1978 | Stournas | 252/8.55 D |
| 4,110,226 | 8/1978 | Swanson | 252/8.5 C |
| 4,110,231 | 8/1978 | Swanson | 252/8.5 |
| 4,123,366 | 10/1978 | Sauber et al. | 252/8.5 C |
| 4,142,595 | 3/1979 | Anderson et al. | 175/72 |
| 4,155,410 | 5/1979 | Jackson et al. | 175/66 |
| 4,169,818 | 10/1979 | DeMartino | 260/17 R |
| 4,172,055 | 10/1979 | DeMartino | 260/17 R |
| 4,201,596 | 5/1980 | Church et al. | 127/37 |
| 4,239,629 | 12/1980 | Sauber | 252/8.5 |
| 4,239,906 | 12/1980 | Antrim et al. | 536/56 |
| 4,290,899 | 9/1981 | Malone et al. | 252/8.55 R |
| 4,299,710 | 11/1981 | Dupre et al. | 252/8.5 A |
| 4,352,770 | 10/1982 | Turbak et al. | 264/187 |
| 4,356,096 | 10/1982 | Cowan et al. | 252/8.5 C |
| 4,366,070 | 12/1982 | Block | 252/8.5 P |
| 4,392,964 | 7/1983 | House et al. | 252/8.5 C |
| 4,422,947 | 12/1983 | Dorsey et al. | 252/8.5 C |
| 4,424,347 | 1/1984 | Rähse et al. | 252/8.5 LC |
| 4,439,333 | 3/1984 | House et al. | 252/8.5 C |
| 4,451,389 | 5/1984 | Clear | 252/8.5 C |

FOREIGN PATENT DOCUMENTS 2066145 7/1981 United Kingdom .

OTHER PUBLICATIONS

Yanovsky, E., 1939, Extraction of Hemicelluloses from Plant Materials, Industrial and Engineering Chemistry, Jan., pp. 95–100.

Miller, et al., 1948, By-Products from Sugar Beets, Chemurgic Digest, Apr., pp. 21–24.

Primary Examiner—Stephen J. Lechert, Jr.
Assistant Examiner—Howard J. Locker
Attorney, Agent, or Firm—Woodcock Washburn Kurtz Mackiewicz & Norris

[57] ABSTRACT

Circulating and non-circulating well-drilling fluids are provided comprising parenchymal cell cellulose. In accordance with a preferred embodiment, improved viscosity and fluid loss control in circulating well-drilling fluids are obtained from the inclusion of parenchymal cell cellulose in such fluids. In accordance with another preferred embodiment, certain polymers, especially anionic polymers, and polymers derived from hemicellulosic materials are admixed with parenchymal cell cellulsoe in well fluids to provide synergistic fluid loss control and other beneficial properties. Methods for the employment of circulating and non-circulating well fluids employing parenchymal cell cellulose are also disclosed.

15 Claims, No Drawings 4,629,575

WELL DRILLING AND PRODUCTION FLUIDS EMPLOYING PARENCHYMAL CELL CELLULOSE

This application is a continuation in part of Application Ser. No. 414,931 filed Sept. 3, 1982 (now abandoned). The entirety of Ser. No. 414,931 (now abandoned) is incorporated herein by reference.

BACKGROUND OF THE INVENTION

This invention is directed to materials for the drilling of and production from wells, especially oil and gas wells. More particularly, this invention is directed to compositions for inclusion in circulating and non-circulating fluids useful in the drilling for and production of oil and gas from wells.

Circulated fluids for use in the drilling of subterranean wells are complex suspensions or fluid emulsions. The purpose of the circulating fluids is manifold in that the fluid serves to cool and lubricate the drilling apparatus, to carry cuttings away from the drill bit to the surface, and to control downhole formation pressures and conditions. Due to the diversity of geological formations encountered in oil and gas recovery, drilling fluids require frequent maintenance; they are usually custom-blended to provide the specific rheology and other properties required for each situation. In recent years, the tendency has been towards the drilling of deeper wells. This tendency has increased the demands placed upon drilling fluid performance in that significant formation variation is often encountered in a single well and that the overall temperature range experienced during drilling can become quite high—often exceeding an order of magnitude. Additionally, the increased depth of certain wells and the tendency for oil and gas to be sought for in regions having substantial geologic pressures, place stringent demands upon drilling fluids. Thus such fluids must increasingly be capable of performing under conditions of high temperature, high density and high salt content.

Non-circulating fluids useful in the recovery of oil and gas are generally employed subsequent to the initial drilling of a recovery well. Such fluids include completion and workover fluids, packing fluids, fracturing fluids, stimulation fluids, water retention agents useful in connection with drilling cement, and other fluids. Each of the foregoing types of non-circulating fluids require certain, well-known properties for good effect. As with circulating fluids, non-circulating fluids are frequently tailor-made or custom-blended to meet the particular requirement of a particular well or geological formation, and each must be capable of utility under increasingly stringent conditions.

The foregoing and other fluids for use in the drilling for and production of oil and gas and in other well-drilling applications are well-known to those skilled in the art. Moreover, the qualities which are necessary to insure good performance in each of the foregoing fluids are similarly well-known. Further explanation of those properties and of fluids which are useful in the production of oil and gas may be had from a review of the publications, *Composition and Properties of Oil Well Drilling Fluids*, 4th Ed., G. R. Gray, Gulf Publishing Co., Houston (1980); and *Drilling and Drilling Fluids*, Developments in Petroleum Science, 11, Chilingarian et al., Elsevier, N.Y. (1981), each of which is incorporated herein by reference.

In order to provide circulating and non-circulating fluids for use in the production of oil and gas, it is desired to employ materials which are capable of providing beneficial rheological and other properties to such fluids. It is of principal importance that such materials be capable of providing defined viscosities over a wide range of downhole conditions including extremes in temperature, pH, pressure, salt content, and geological conditions. At the same time, materials for preparation of circulating and non-circulating fluids most desirably should be compatible with other fluid components and adducts, such as clays, surfactants, weighting agents, brines, oleagenous fluid components, and other materials.

Among the principal properties which are desirable to be incorporated in materials suitable for the preparation of circulating fluids is the ability to contribute to viscosity so as to improve, inter alia, the ability of the fluid to remove cuttings from a progressing well. Additionally, such materials preferably are able to seal off porous geological structures through which the well progresses so as to minimize or eliminate loss of circulating fluid to the geological formation. Preferably, such filtration control is not accompanied by irreversible phenomena such that re-exposure of the formation porosity to the well shaft can be accomplished if desired. The foregoing properties are, ideally, maintainable through the extremes of pH, temperature, salt content, etc. which may be experienced in oil field operations. Moreover, such compositions should also exhibit beneficial rheological and filtration control properties in the presence of other common circulating fluid additives and components. Accordingly, compositions which are suitable for the attainment of the foregoing objectives have long been sought by the petroleum production industry.

Non-circulating fluids for oil and gas production also have particularized rheological and other properties which should be exhibited by compositions intended for use in the formulation of such non-circulating fluids. Thus, for example, fracturing fluids should be capable of suspending propping agents through the maintenance of high viscosity and gel strength, which viscosity and support is maintained under conditions of high pressure and throughout the range of conditions which may be experienced downhole. Completion and workover fluids have other requirements which are well-known to those skilled in the art including the need to maintain viscosity under a wide range of temperatures and other conditions. Those properties which are important to a particular kind of circulating or non-circulating fluid for downhole operations are well-known to those skilled in the art. Reference to the foregoing publications, which have been incorporated herein by reference, will provide further insight into such requirements. Accordingly, compositions which are suitable for the maintenance of viscosity and other rheological properties, for the control of fluid loss to geologic strata, for the suspension of particulate propping agents and the like, for the delivery of acid stimulation media to a formation, for the maintenance of downhole pressure to avoid blowouts through inclusion in weighted fluids, and for the numerous other uses to which oil and gas fluids may be put, all under widely varying conditions, have long been sought by the petroleum production industry.

Numerous cellulosic materials as components for fluids designed for use in conjunction with the production of oil and gas have been used or proposed for use. Cellulosic ether derivatives such as carboxymethyl cellulose, CMC, are known to be useful ingredients of downhole fluids used for oil and gas production. More particularly, CMC has been used as a viscosifying agent or drilling additive to control fluid loss in circulating fluids. U.S. Pat. Nos. 3,446,795, 3,471,402, 3,727,688, 4,043,921, 4,068,720, 4,110,226, 4,110,231, 3,506,644, 3,668,122, 3,954,628 and others disclose carboxymethyl cellulose and related cellulosic materials for such uses. Other hydroxyalkyl celluloses and alkyl ether substituted celluloses have also been used for thickening clay-based drilling fluids and the like. Such materials are chemically modified celluloses which form, in general, water soluble, high molecular weight polymers whose solution properties can include high viscosity. Such modified celluloses are disclosed in, for example, U.S. Pat. Nos. 4,290,899, 4,155,410, 4,169,818, 4,239,629, 4,299,710, 4,096,074, 4,172,055, and 4,239,629.

Cellulosic plant material has been included in certain oil and gas fluids. Thus, U.S. Pat. No. 4,082,677 discloses certain phosphorylated agricultural by-products for use in drilling fluids. U.S. Pat. No. 3,042,608 is directed to the use of ground particulate thermal-setting plastic materials and plant matter as materials for circulation control. U.S. Pat. No. 3,441,528 discloses pentosan-containing lignocellulosics such as seed hulls, bagasse, or corn cobs for the preparation of elastic gels useful as drilling muds. U.S. Pat. No. 2,912,380 is directed to fibrous vegetable materials in conjunction with plastic substances for the control of fluid loss in wells. U.S. Pat. No. 3,788,405 provides plugging of well bore formations by circulation of cellulosic pulps such as wood pulp through the well. Numerous other, prior, formation plugging materials are also disclosed in that patent.

U.S. Pat. No. 3,852,200 discloses microcrystalline cellulose, MCC, as a thickening and gelling agent for the suspension of abrasive particles used in a particular drilling technique.

Certain non-cellulosic vegetable materials and gums have been disclosed in conjunction with oil production fluids. Thus, U.S. Pat. No. 4,142,595 discloses flaxseed gum as a shale stabilizing component of a drilling fluid. Xanthan gum in a calcium chloride, carboxymethyl cellulose completion fluid is disclosed in U.S. Pat. No. 3,625,889. Certain particulate wax compositions are disclosed for fluid loss control in U.S. Pat. No. 3,882,029.

As discussed above, particulate, ground cellulosic substances are known in the drilling art for combating lost circulation in wells. Lost circulation occurs when the proximate formation being drilled is unconsolidated, highly porous, or contains cavernous voids into which drilling mud escapes. Examples of the vegetable materials which have been known for employment to plug such formations include ground wood, ground walnut shells, shredded paper or shredded vegetable matter such as cornstalks, sugar cane, bagasse, or sugar beet pulp. These materials are added to drilling fluids to provide a large particle bridging sealant which alone or in combination with smaller particles plugs porous and fractured formations. Such materials can also be used as an inexpensive bulk filler for naturally occurring voids.

OBJECT OF THE INVENTION

It is a principal object of this invention to provide improved methods for drilling, completing and maintaining wells, especially wells for the production of oil and gas.

It is another object of this invention to provide methods for drilling wells employing novel circulating fluids.

A further object is to provide well-drilling methods employing materials which lend improved viscosity and fluid loss control to the circulating fluids employed therein.

Yet another object is to provide such fluids which are stable to extremes in temperature, pH, salt content, and density.

Yet another object is to provide improved cellulosic drilling fluids for use in circulating and non-circulating well fluids.

Yet another object of this invention is to provide synergistic blends of certain materials with polymers which are capable of maintaining improved rheological properties and fluid loss control in well-drilling fluids.

Well-drilling and other fluids, which fluids are compatible with common drilling fluid components and additives together with methods employing them are further objects of this invention.

It is a further object to provide fluids which are stable to high temperatures.

Oil and gas fluids and methods employing them having relatively low cost and high reliability are yet another object of the present invention.

Non-circulating well-drilling fluids including fracturing, completion, work-over, stimulation and other fluids having improved, stable properties are further objects of the present invention.

Citrus, beet pulp and other parenchymal cell celluloses having in association therewith certain soluble polymers for use in well fluids are further objects of the present invention.

These and other objects will become apparent from a review of the present specification.

It has been discovered that circulating and non-circulating fluids for use in the drilling and preparation of oil, gas, and other wells may beneficially be formulated employing parenchymal cell cellulose. Such fluids have been found to have excellent viscosity control, good fluid loss control, and to be compatible with common components and additives for oil field and other fluids. Moreover, such fluids can be formulated having good stability to temperature, pH, density, and salt content.

In accordance with certain preferred embodiments, such fluids are supplemented by the presence of certain polymers, especially anionic polymers, which have been found to yield synergistic results in combination with parenchymal cell cellulose in the control of fluid loss to porous subterranean formations. In connection with the present specification, fluid loss control is used interchangeably with filtration control. In accordance with yet another preferred embodiment, the parenchymal cell cellulose and anionic polymer(s) may be prepared conveniently by the alkaline liberation of parenchymal cell cellulose from sugar beet pulp and certain other parenchymous sources.

In accordance with a further preferred embodiment, a synergistic system for improving fluid loss control in circulating drilling fluids may now be had employing parenchymal cell cellulose, a soluble polymer, preferably an anionic polymer, and one or more clays. The unique structure of parenchymal cell cellulose is believed to have properties which are especially suitable for interaction with clay particles and certain polymers so as to seal off a wide variety of subterranean porous structures, thus to minimize fluid loss to such formations.

Methods for drilling wells, especially oil and gas wells employing circulating fluids in accordance with the present invention are also provided hereby. Additionally, non-circulating fluids and methods for their employment including packing fluids, completion fluids, workover fluids, stimulation fluids, fracturing fluids, and many other well known non-circulating fluids may also beneficially employ parenchymal cell cellulose in accordance with the present invention. All of the foregoing uses benefit from parenchymal cell cellulose's excellent stability to a wide range of chemical and physical conditions.

New drilling fluid compositions which eliminate most, if not all, of the inadequacies associated with mineral-, or clay-based drilling fluids are provided by this invention. Broadly speaking, the invention describes compositions of drilling and other downhole fluids including non-circulating fluids, obtained by dispersing a novel, particulate form of cellulose derived from parenchymal cell tissue of certain plants, especially sugar beets and citrus, in water, oil or brines. The composition may also, preferably, contain various amounts of hemicellulosic substances in modified or native form as well as polymers, especially anionic polymers and other beneficial minerals, salts, and organic materials. Methods of producing dispersed preparations of parenchymal cell-derived cellulose are described in U.S. patent application Ser. No. 414,931, filed Sept. 3, 1982 (now abandoned) by the inventor of the present invention. Ser. No. 414,931 (now abandoned) has been incorporated by reference herein.

Parenchymal cell-derived cellulose (PCC) has been found to be unique among native cellulose isolates in that it forms viscous, gravitationally stable suspensions at low solids content. In the concentration range of 0.5 to 3.0% w/w, PCC forms a gel-like, aqueous suspension which displays psuedoplasticity. This behavior can be approximated by the Bingham plastic model used to describe highly flocculated clays. This unusual rheology is believed to be associated with the unique micromorphology of PCC. PCC exists predominantly as a dispersed ensemble of thin, flexible cellulosic membranes resulting from the disintegration of the parenchymal cell complex characteristic of certain plant matter, especially sugar beet, citrus, Jerusalem artichoke, etc., to liberate the parenchymal cell material from associated fibrous cellulose and from hemicellulosic and other components of the complex. The PCC suspension rheology has been found to be highly stable to the effects of mechanical shear, pH, high temperature excursions and dissolved salts.

The micromembrane geometry of PCC allows thin film stacking or layering of the cellulose structure to form low fluid permeability films at porous interfaces and filtering surfaces having pore diameters in excess of 100 mesh. These films act as primary filters for small suspended clay particles or interactive polymers which can be retained thereupon further to reduce permeability. This property is very desirable in drilling fluids as the existence of porous formations in newly drilled sections of the well which have not been cased combined with the high hydrostatic pressure of the fluid column in the well shaft tends to cause fluid loss into the proximate formations by a filtration effect. The result, if uncorrected, is that the suspending fluid penetrates into the exposed formation leaving an increased solids suspension behind. The higher solids suspension often displays significantly altered rheology leading to impaired mud circulation and other undesirable characteristics. This phenomenon is a serious problem with simple clay based drilling fluids. Clay based drilling muds are also believed to be a major contributor to irreversible damage of producing formations due to significant penetration into the productions formation by the fine clay particles which block the capillary formation structure and obstruct the flow of gas and oil out into the collector string.

It has further been discovered that the incorporation of certain other polymers constituent to the parenchymal cell complex and designated as hemicelluloses, HC, into the PCC suspension can contribute synergistic improvement to fluid loss control under certain conditions. These hemicellulosic components may be isolated either concomitantly with PCC or separately and later recombined to provide improved performance of the PCC based drilling fluid. It is believed that pectin and polygalacturonic acid or pectinic acid are important components of such hemicelluloses in this respect. Additive compatibility or synergism of the PCC/HC system with numerous other fluid filtration and rheology control additives or polymers has also been discovered. Other polymers, especially soluble, anionic polymers can also function synergistically in this capacity.

The above properties of the PCC/HC complex make it an ideal agent for aqueous drilling fluids in that it forms low solids gels which exhibit good suspending properties for particulate matter such as sand or rock shards, yet exhibits low viscosity at high shear conditions such as those found at the drill bit. Thermal and salt stable rheology, and inherent resistance to fluid loss into porous subsurface formations is also exhibited by the PCC/HC complex.

While, as indicated previously, sugar beet pulp, which is a preferred precursor plant material for the preparation of parenchymal cell cellulose, has been known for use in connection with oil drilling applications, the proximate material known for such use is entirely dissimilar from those useful in connection with the present invention. Thus, sugar beet pulp, when placed in water, such as in a shredded form known to the prior art, hydrates to a mushy and sponge-like mass of pulpy plant tissues in the form of thin slivers several centimeters long, or "cossettes". While parenchymal cell cellulose can be derived from spent sugar beet pulp, there is neither a physical nor a chemical similarity between the two materials other than the fact that one is a precursor for the other. A structural and compositional analogy for the relationship between sugar beet pulp and parenchymal cell cellulose and other components derived from it can be made to shredded wood used for lost circulation control and to the converted products derived therefrom which may be useful in drilling fluids. Such materials may include cellulose ethers and lignosulfonates.

A similar comparison can be found to distinguish between precursor and native cellulose forms which may be useful as lost circulation materials in drilling fluids and processed cellulose preparations derived therefrom which are useful for control of the basic rheology of drilling fluids. Thus, fibrous forms of native cellulose, such as cotton and wood, find use as lost circulation materials in the manner analogous to raw sugar beet pulp. Such cellulosic substances are precursor materials useful in the preparation of microcrystalline cellulose, a particulate cellulose with gross dimension two to three orders of magnitude smaller than the native forms of cellulose from which it is derived. The numerous patents to Battista, referred to in Ser. No. 414,931, disclose the use of dispersed microcrystalline cellulose, MCC, in the preparation of drilling fluids, particularly for jet drilling.

Accordingly, parenchymal cell cellulose must be distinguished from the material from which it is prepared, i.e. raw sugar beet or citrus pulp. Additionally, parenchymal cell cellulose is to be distinguished from non-parenchymal materials such as wood pulp and from cellulosic materials such as microcrystalline celluose, MCC, which may be derived therefrom. In this regard, a partial explanation for the foregoing differences may be had from a review of the reference, *Cellulose and Other Natural Polymer Systems*, Brown ed., Plenun (1982). A more thorough explanation of the foregoing relationships may be had from a review of Ser. No. 414,931 which has been incorporated herein by reference.

A further distinction must be drawn to the particulate celluloses for use in drilling fluids which are disclosed in U.S. Pat. No. 4,356,096. The foregoing reference teaches the use of treated, mechanically degraded linters for service as a hydrophobic, organophilic, water-wettable adsorbent, which in conjunction with certain lubricant additives can be useful in forming a high lubricity film about a well bore hole. This organophilic, adsorbent form of cellulose is morphologically and functionally distinct from parenchymal cell cellulose.

In order further to elaborate upon the beneficial characteristics which attend the employment of parenchymal cell cellulose either with or without admixture of certain polymers, especially hemicelluloses, in the preparation of circulating and non-circulating well fluids, the following examples are provided. It is believed that those of ordinary skill in the art will readily appreciate the wide utility of the drilling fluids and processes taught hereby. While such persons will understand that the number of examples are, of necessity, limited, it will be further appreciated that the materials, methods and concepts taught hereby enjoy wide potential utility in the production of oil and gas and for other well-drilling and production uses.

Further explanation of representative well fluids which may benefit from inclusion of PCC in accordance with the present invention can be had from review of *Production Operations 1—Well Completions, Workover and Stimulation*, Thomas O. Allen and Alan P. Roberts, Oil and Gas Consultants International, Tulsa, Okla. (1982); and *Well Completions, Volume 1—SPE Series 5a* published by The Society of Petroleum Engineers, Dallas, Tex., 2nd Ed., (1980), each of which is incorporated by reference herein. The following examples are intended for the foregoing purpose; they are not to be construed as limitations on the scope of this invention.

It is to be specifically understood, that, as of the time of the filing of the present application, no actual subterranean employment of circulating or non-circulating fluids in accordance with the present invention has actually been performed. Notwithstanding this fact, however, the excellent performance of the materials of the present invention on standardized tests such as the fluid loss control test developed by the American Petroleum Institute, A.P.I., demand the conclusion that subterranean employment will likely be quite successful. Similarly, standardized viscosity and other rheological tests lend a similar conclusion as to the efficacy of the employment of parenchymal cell celluloses in subterranean fluids wherein rheological properties are of substantial importance.

EXAMPLES

The following illustrative examples teach specific embodiments of the invention. Unless otherwise specified all percentages are based upon weight to volume and viscosities are in centipoise at specified rotational viscometer speeds. The viscometer readings unless otherwise specified were taken at an apparent steady state reading to minimize time dependent artifacts arising from thixotropic effects. Filtration control was determined using the standard low pressure A.P.I. test, which is incorporated herein by reference. The fluid loss data were gathered on Baroid Model 301 low pressure filtration cells or similar equipment.

The following materials and additives were employed in the examples.

PCC: A crude parenchymal cell cellulose derived from sugar beet or citrus pulp. Isolates of such cellulose have been shown to consist predominantly of membranous structures which display desirable rheology when dispersed in aqueous media. See Examples 1 and 8 of Ser. No. 414,931 (abandoned) for exemplary preparations of this material.

PCC-BC: A $ClO_2$ bleached preparation of PCC which has been mechanically classified to remove fiber-like or nondispersed cellulosic particles. See Examples 2 through 5 of Ser. No. 414,931 (abandoned) for exemplary procedures.

PCC-C: An unbleached preparation of PCC classified as in Example 5 of Ser. No. 414,931 (abandoned) to separate fiber and nondispersed cellulosic particles.

HC: The soluble hemicellulose complex isolated from sugar beet pulp. See Examples 6–8 of Ser. No. 414,931 (abandoned).

HC-S: An alkaline saponified preparation of the hemicellulose complex isolated from sugar beet pulp in accordance with Example 8 of Ser. No. 414,931 (abandoned).

SAP: An alkaline converted sugar beet pulp in which both particulate PCC and soluble HC-S are present. The ratio of HC-S to PCC nonvolatile solids depends upon the method of preparation but typically ranges from 1 to 2.

PG: A polygalacturonic acid derived from citrus pectin.

Rev-Dust: An aluminum silicate containing kaolinite (74.1%), $\alpha$-quartz (17.3%) and $\alpha$-cristobalite (7.6%) as the major components. It is considered as representative of drilled clay solids of the kaolinite class for addition to test mud compositions. The average particle size of this preparation is 2 microns with 93% passing a 325 mesh screen. A trademarked clay from Milwhite Co., Inc., Houston, Tex.

Grundite: A predominantly illitic clay containing illite (41.4%), illite/montmorillonite (24.3%), $\alpha$-quartz (18.5%) and kaolinite (7.2%) as the major components. It is considered as representative of drilled clay solids of the illitic class for addition to test mud compositions. A trademarked clay from the Macobar Division of Dresser Industries, Houston, Tex.

Impermex: A commercial grade of drilling starch used as a fluid loss control agent. A trademarked product of the Baroid Division of NL Industries, Houston, Tex.

Aquagel: A commercial A.P.I. grade, high yield sodium montmorillonite clay used for drilling fluid rheology and filtration control. A trademarked product of the Baroid Division of NL Industries, Houston, Tex.

Zeogel: A commercial A.P.I. grade attapulgite clay for rheology control of brine based drilling fluids. A trademarked product of the Baroid Division of NL Industries, Houston, Tex.

Calcium Carbonate $CaCO_3$: A high purity limestone milled to 95% passing through a 325 mesh screen.

Klerzyme L-100: A commercial pectinase enzyme preparation. A trademarked product of Miles Laboratories, Elkhart, Ind.

Pectinol 60B: A pectinase enzyme preparation. A trademarked product of Corning Glass Works, Corning, N.Y.

Barite: A commercial A.P.I. specification grade of barium sulfate used as a weighting agent in downhole fluids.

Hematite: A commercial preparation of iron oxide used as a weighting agent in downhole fluids.

Lignite: A commercial grade of brown coal having a high humic acid content. It is used as a thermophilic thinner, emulsifier and fluid loss additive in both oil and water based drilling fluids.

$CMC_{1v}$: Sodium salt of carboxymethyl cellulose having a viscosity of 25–50 cps at 25° C. in a 2% w/v solution.

Drispac: A polyanionic cellulose used as an additive for control of fluid loss in fresh or salt water drilling fluids. A trademarked polymer product of the Drilling Specialties Company, Bartlesville, Okla.

XC: A commercial grade biopolymer excreted by Xanthomonous useful as a rheology control agent in downhole circulated fluids.

All other reagents, additives or chemicals are either commercial grades obtained through retail chemical distributors or, if proprietary products, identified by source.

EXAMPLE 1

Thermal Effects on PCC Rheology and Stability of PCC at High Temperature

A 0.8% w/v suspension of a bleached and classified cellulose preparation (PCC-BC) was homogenized for 15 minutes on a Waring blender at high speed. The pH of the homogenate as measured at 26° C. was 4.6. The temperature of the homogenate as obtained from the blender was approximately 80° C. and the temperature was systematically lowered for subsequent viscosity measurements. The viscosity profile was taken over the range of 100 to 600 rpm on a model 30 Fann viscometer and at 60 rpm on a model LVF Brookfield viscometer using a #3 spindle. The Brookfield viscosities are normalized and expressed as percent of the 21° C. viscosity. Fann readings were not taken until a stable reading was obtained (usually within 5 minutes) and the Brookfield reading typically required 15 to 30 minutes before a stable reading was obtained. The latter result is likely due to thixotropic effects of radial relaxation by the deformable PCC particles in response to shear from the viscometer spindle. Minor evaporative losses at 50° C. to 80° C. were controlled by periodic, measured addition of water. The results are summarized in Table 1.

TABLE 1

| | Fann Viscosity, cps | | | | Relative Brookfield Viscosity | |
|---|---|---|---|---|---|---|
| Temp. | 600 rpm | 300 rpm | 200 rpm | 100 rpm | Temp. | % |
| 78° C. | 12 | 18.5 | 19.5 | 28.5 | 65° C. | 36 |
| 58 | 14 | 22 | 23 | 37.5 | 58 | 48 |
| 50 | 16 | 24.5 | 27 | 42 | 52 | 56 |
| 38 | 19.5 | 29.5 | 32 | 49.5 | 44 | 63 |
| 26 | 23.5 | 37 | 42 | 69 | 32.5 | 75 |
| 17 | 26 | 42 | 56 | 90 | 21 | 100 |
| 12 | 28 | 46.5 | 62 | 99 | 17.5 | 102 |

These results indicate that the viscosity of PCC varies inversely with temperature. The relationship is not linear and the apparent viscosity is approximately halved over a fifty degree interval reflecting a relatively low thermal coefficient of viscosity. The plastic viscosity shows a twofold increase over this temperature range and appears to plateau at 25° C. The yield point triples over the same range.

PCC has high thermal stability as indicated by a comparative, static incubation at 350° F. versus xanthan gum (XC). The concentrations of PCC and XC were 1.67% w/v and 1.0% w/v, respectively, where the weights of the nonvolatile particulate cellulose solids are uncorrected for ash. Both polymer preparations were homogenized for 15 minutes at high speed on a Waring blender, cooled at room temperature and the pH adjusted to 9.0. In the case of the XC polymer the homogenate contained 3 drops of a commercial antifoam (Dow 544) per 600 ml to control foaming. The static incubation was carried out in stainless steel tubular vessels at 350° F. for 14 hours. The contents were not deaerated and the volumetric ratio of head space to liquid within the incubation vessels was approximately 1 resulting in a highly oxidative environment. After incubation the contents of the incubation vessel were rehomogenized for 5 minutes and the pH adjusted to 9.0 before rheological examination at 26° C. The results are summarized in Table 2.

TABLE 2

| | Fann Viscosity, cps | | | |
|---|---|---|---|---|
| | 600 rpm | 300 rpm | 200 rpm | 100 rpm |
| PCC Control | 75 | 110 | 120 | 207 |
| XC Control | 27.5 | 49.5 | 70 | 129 |
| PCC Aged 14 hr. | 21.5 | 20 | 21 | 28.5 |
| XC Aged 14 hr. | 0 | 0 | 0 | 0 |

These results indicate that while XC is completely degraded at the high temperature and oxidative environment of this experiment, PCC is not; it retains a significant proportion of its original viscosity at 600 rpm.

EXAMPLE 2

Stability of PCC in High Temperature Brine

PCC also shows high thermal stability in the presence of brine. Two preparations of PCC were used to demonstrate this fact—one bleached and classified, PCC-BC, and the other mechanically classified but unbleached, PCC-C. The particulate cellulosic pulp solids contained some inorganic content as evidenced by a 5% ash residue. Both PCC preparations were made at 1% w/v in either saturated NaCl brine or water. The homogenates were blended at high speed in a Waring blender for 15 min., cooled to room temperature and the pH adjusted to 9.0 with concentrated NaOH. In the case of the NaCl brine, the pH was corrected for effects of salt on the glass electrode of the pH meter. In contrast to the high temperature incubations of Example 1, this 350° F. incubation was carried out in a non-oxidizing atmosphere. The PCC homogenates were repetitively degassed by vacuum aspiration and pressurized at 100 psi with $N_2$ in situ for three cycles. After incubation for 16 hours, the contents of the incubation bombs were cooled to room temperature and the "as is" Fann profile taken. The pH of the samples was then adjusted to 9.0 and the samples were homogenized for 5 minutes at high speed in the Waring blender before obtaining a second "blended", Fann profile. The results are tabulated in Table 3.

TABLE 3

| Composition/Temperature | Fann Viscosity, cps | | | |
|---|---|---|---|---|
| | 600 rpm | 300 rpm | 200 rpm | 100 rpm |
| 1% w/v CC—BC in Water, 60° F. | 43.5 | 77 | 99 | 159 |
| 1% w/v PCC—BC in Water, 350° F. "as is" | 25 | 24 | 27 | 39 |
| 1% w/v PCC—BC in Water, 350° F. "blended" | 21.5 | 23.5 | 24 | 33 |
| 1% w/v PCC—BC in Brine, 60° F. | 57 | 100 | 135 | 228 |
| 1% w/v PCC—BC in Brine, 350° F. "as is" | 22 | 27 | 25 | 33 |
| 1% w/v PCC—BC in Brine, 350° F. "blended" | 20.5 | 27.5 | 27.5 | 39 |
| 1% w/v PCC—C in Water, 60° F. | 28.5 | 49.5 | 65.5 | 114 |
| 1% w/v PCC—C in Water, 350° F. "as is" | 20 | 24 | 21 | 28.5 |
| 1% w/v PCC—C in Water, 350° F. "blended" | 16 | 21 | 22.5 | 30 |
| 1% w/v PCC—C in Brine, 60° F. | 34 | 57 | 76 | 127.5 |
| 1% w/v PCC—C in Brine, 350° F., "as is" | 16.5 | 20 | 21 | 27 |
| 1% w/v PCC—C in Brine, 350° F., "blended" | 13 | 15 | 15 | 30 |

Both forms of classified PCC, bleached and unbleached, show similar behavior upon high temperature incubation in the presence of saturated NaCl. Both lose approximately 50% of their viscosity as measured by the Fann viscometer at 600 rpm and the resulting homogenates demonstrate little shear dependence upon the apparent viscosity. The bleached, classified PCC under the conditions of these experiments shows about 1.5 times the viscosity of the unbleached preparation at an equivalent solids concentration.

EXAMPLE 3

Effect of Post Reactor Homogenization and Alkaline Treatment on Fluid Loss Control of a PCC/HC Composition A 1.5% w/v (particulate solids basis) suspension of a PCC/HC blend was prepared from an acid converted beet pulp in accordance with Examples 6 and 7 of Ser. No. 414,931. The total nonvolatile solids in the suspension was 3.7% w/v and is uncorrected for inorganic ash content. The initial pH of the slurry was 3.0. Aliquots of the acid converted pulp suspension received the following treatment(s):

1. Control—homogenized as is.
2. Not homogenized, pH adjusted to 11.2 and slurry incubated for 3.5 hrs. to effect saponification. Final pH was 9.7.
3. Saponified as in 2., with homogenization after incubation.
4. Saponified as in 2., incubated overnight at room temperature, homogenized and the pH adjusted from 9.1 to a final pH of 6.5.

Homogenization was achieved by blending a 300 ml aliquot in a Waring blender at high speed for approximately 5 minutes. The resulting homogenates were quite foamy but were not degassed prior to testing. Fluid loss rates were measured; Table 4 summarizes the results.

TABLE 4

| SAMPLE # | HOMO-GENIZED | SAPON-IFIED | FINAL pH | FILTRATION RATE, ml | |
|---|---|---|---|---|---|
| | | | | 1 MIN. | 30 MIN. |
| 1 | Yes | No | 3.0 | 7.5 | 111.5 |
| 2 | No | Yes | 9.7 | 7.0 | 30.0 |
| 3 | Yes | Yes | 9.7 | 5.0 | 22.5 |
| 4 | Yes | Yes | 6.5 | 4.5 | 21.0 |

Saponification or alkaline treatment of an acid converted beet pulp slurry is desirable for improving fluid loss control. Further batch homogenization of the reactor slurry also improves filtration control. The filtration rate appears to be relatively independent of pH over the interval pH 6.5 to 9.7.

EXAMPLE 4

Maintenance of PCC Rheology and Fluid Loss Control Under Conditions of Differing pH Two converted pulp suspensions at approximately 1% w/v particulate cellulosic solids were prepared as follows. An acid converted beet pulp slurry at 5.2% w/v (nonvolatile solids uncorrected for inorganic ash content) was saponified at room temperature by two additions of 10N NaOH to make the total added base concentration 0.3N. A 500 ml aliquot containing 3 drops of antifoam (Dow 544) was diluted 2.5 fold, homogenized in a Waring blender for 5 minutes at high speed and allowed to stand at room temperature for 24 hours to yield a PCC/HC-S. The original acid converted pulp slurry was pressed to remove HC, bleached and mechanically classified on a two stage 94/200 mesh screening device. The bleached PCC-BC was diluted to 1% w/v (nonvolatile solids uncorrected for inorganic ash content). Both of the above preparations were homogenized with a submerged shaft, high speed Hamilton mixer and defoamed by addition of 100 ppm antifoam. The pH of the final saponified PCC/HC-S preparation was 11.8 and it contained an estimated 0.8% w/v particulate cellulosic solids and 1.2% w/v soluble hemicellulose. The pH of the PCC-BC homogenate was adjusted to pH 11.9 with conc. NaOH. The viscosity profiles were obtained at 23° C. with a model LVF Brookfield viscometer using spindle #2 at 60 rpm. Viscosities are reported as limiting, time independent values. The results are tabulated in Table 5.

TABLE 5

| pH | VISCOSITY PCC/HC-S, cps | VISCOSITY PCC-BC, cps |
| --- | --- | --- |
| 11.9 | 147 | 178 |
| 11.0 | 153 | 188 |
| 10.0 | 158 | 185 |
| 9.0 | 148 | 180 |
| 8.0 | 150 | 162 |
| 7.0 | 152 | 180 |
| 6.0 | 140 | 181 |
| 5.0 | 152 | 188 |
| 4.0 | 148 | 180 |
| 3.0 | 142 | 188 |
| 1.5 | 140 | 178 |

The results indicate that the solution viscosity which is controlled by PCC is independent of hydrogen ion concentration over 10 orders of magnitude. The unit viscosities of both preparations are nearly identical if corrected for the difference in particulate cellulosic solids.

A low pressure A.P.I. static filtration test was performed on both homogenates at the high and low pH extremes. Below in Table 6 are tabulated the results of an abbreviated A.P.I. test (7.5 min. vs. the usual 30 min.) upon the two preparations.

TABLE 6

| pH | PCC/HC-S | PCC-BC |
| --- | --- | --- |
| 1.5 | 1 min. 40 ml filtrate | 1 min. 52 ml filtrate |
|  | 7.5 min. 111 ml filtrate | 7.5 min. 128 ml filtrate |
| 11.8 | 1 min. 12 ml filtrate | 1 min. 48 ml filtrate |
|  | 7.5 min. 23.5 ml filtrate | 7.5 min. 115 ml filtrate |

In contrast to the results of the viscosity profile, the fluid loss rate of the PCC/HC-S homogenate is pH sensitive. The presence of HC-S is believed to exert a synergistic, beneficial effect upon fluid loss control at high pH. In the acid region below the approximate pK of 3-4 for the pectinic acid component of HC, the filtration control effect disappears and the filtration rate level reverts to that of PCC alone.

EXAMPLE 5

Shear Stability of PCC

The gross rheology of dispersed forms of the native isolate of parenchymal cell cellulose approaches a stable, limiting value upon exposure to high shear. This is believed to be related to dissociation and dispersion of the membrane complex. Crude PCC, such as the press cake isolated from an acid converted pulp containing both membrane and fiber-like forms of cellulose, as well as purified forms of PCC such as bleached/classified suspensions of PCC-BC which contain only the membrane fraction, display this phenomenon. A 1.5% and 1.2% w/v suspension of PCC-BC and PCC, respectively, was prepared and the pH of each adjusted to 11.0. The solids are reported as nonvolatile solids and are uncorrected for inorganic ash content. Five drops of anti-foam (Calgon CL-371) were added to 700 ml of each cellulosic suspension and they were blended at high speed in a Waring blender for specified periods of time. The contents of the sealed blender jars accumulate considerable thermal energy and over time approach boiling. Corrections for small evaporative losses were made by addition of water after homogenization where appropriate. The samples were then cooled to room temperature and degassed by vacuum aspiration before instrumental examination. Low pressure fluid loss measurements were cnducted according to A.P.I. specifications. The homogenate viscosity was examined with a Fann viscometer model 35 at room temperature.

The data of Table 7 indicates that the rheology of an unhomogenized PCC suspension shows a preliminary time-dependent shear effect which rapidly plateaus and becomes relatively constant after 30 minutes in a Waring blender. These early time dependent effects are thought to be the consequence of dispersing collapsed and aggregated parenchymal cell walls/membranes. Dispersion of the small amounts of vascular, fiber-like cellulose components, if present, is also believed to occur.

TABLE 7

| | | | | Shear Stability of PCC | | | | |
| --- | --- | --- | --- | --- | --- | --- | --- | --- |
| BLENDING TIME | FINAL TEMP. | pH | apparent VISCOSITY AT 20° C. | 300 rpm VISCOSITY AT 20° C. | FLUID LOSS (ml filtrate at) | | | |
| | | | | | 30 SEC. | 60 SEC. | 7.5 MIN. | 30 MIN. |
| 1.5% w/v PCC-BC | | | | | | | | |
| 5 min. | — | 11.0 | 26 cps | 37 cps | 11.5 | 17.5 | 57.5 | 128.5 |
| 15 min. | — | 10.8 | 38.5 | 49 | 9.5 | 14.5 | 47.5 | 102.5 |
| 30 min. | — | 10.5 | 48.5 | 72 | 10.0 | 15.5 | 48.5 | 101.0 |
| 2 hrs. | 95° C. | 11.0 | 53 | 80 | 10.5 | 15.5 | 47.5 | 97.5 |
| 3 hrs. | 95° C. | 10.9 | 54 | 82 | 11.0 | 16.0 | 48.5 | 101.5 |
| 1.2% w/v PCC | | | | | | | | |
| 5 min. | 27° C. | 10.7 | 21.5 cps | 30 cps | 11.0 | 15.5 | 44.0 | 89.5 |
| 15 min. | 46° C. | 10.7 | 26 | 44 | 7.0 | 10.0 | 29.0 | 59.5 |
| 30 min. | 70° C. | 11.0 | 37 | 66 | 5.5 | 7.5 | 22.0 | 45.5 |
| 45 min. | 78° C. | 10.9 | 37.5 | 69 | 5.5 | 7.5 | 22.0 | 46.0 |
| 1 hr. | 82° C. | 10.9 | 34.5 | 62 | 6.0 | 8.5 | 23.5 | 47.0 |
| 2 hrs. | 95° C. | 11.0 | 38 | 65 | 6.5 | 9.0 | 24.0 | 47.0 |
| 3 hrs. | 95° C. | 10.8 | 38 | 61 | 6.0 | 8.5 | 23.5 | 47.0 |

While examination before and after homogenization under a light microscope shows no obvious systematic change in the size of the dispersed membrane fraction for either preparation, the size of the minor fiber-like component in the case of PCC appears significantly reduced—possibly to a more elementary level. Better fluid loss control of the crude press cake homogenate relative to the bleached and classified PCC-BC is probably the result of a broader particle size distribution and the presence of small amounts of HC-S.

An alternative method to high speed blenders for dispersing PCC is the use of high pressure, in-line annular homogenizers. Colloid mills are also useful but not as efficient as in-line impact valve devices. An alkaline converted pulp, SAP, at 5.0% w/v total nonvolatile solids uncorrected for inorganic ash content was homogenized "as is" and diluted threefold or homogenized subsequent to a threefold dilution. The pH of the diluted homogenate was 6.0 and the particulate solids concentration after the dilution was 0.75% w/v. The homogenizer used was a Gaulin Model 15M and the colloid mill, a Gaulin 2F. A 40 psi feed pressure was used in the case of the homogenizer and a gravity feed used for the colloid mill. The viscosity was measured at 23° C. with a Brookfield Model LVF viscometer at 60 rpm with a #2 spindle using a 20 second reading. Table 8 summarizes the results.

A single pass through the homogenizer at relatively low pressures (3000 to 5000 psi) is sufficient to generate a limiting, stable dispersion of hydrated forms of PCC. Further passes at high pressure (8,000 psi) do not change the rheology of the PCC homogenate. In-line homogenization has been found to be helpful in rehydrating spray dried slurries of PCC-BC, although two or more passes may be required to completely restore optimal homogenate functionality.

TABLE 8

Homogenization of PCC

| Homogenization Pressure | Brookfield Viscosity, cps Homog./3X | Brookfield Viscosity, cps 3X/Homog. | Colloid Mill Disc Separation | Brookfield Viscosity, cps 3X/Homog. |
|---|---|---|---|---|
| 0 | 25 | 25 | 0 | 25 |
| 1000 psi | 176 | 245 | 0.010 inch | 37 |
| 3000 psi | 283 | 366 | 0.005 inch | 42 |
| 5000 psi | 354 | 422 | 0.002 inch | 66 |
| 8000 psi | 356 | 455 | | |

EXAMPLE 6

Dependence of Fluid Loss Control and Rheology on PCC Concentration

A concentrated PCC suspension prepared from an acid converted beet pulp presscake was incubated overnight at pH 11.0° and 80° C. Several diluted PCC suspensions were then prepared ranging in concentration from 0.5 to 2.0% w/v; the pH of the suspensions was adjusted to 7.8. Nonvolatile organic solids are uncorrected for inorganic ash content. Homogenization was achieved using a Waring blender at high speed for several minutes. Viscosities were measured at 20° C. with a Brookfield viscometer model LVF using a #3 spindle at 60 rpm. Viscosities are reported as limiting, time independent values. Low pressure fluid loss data were also gathered.

TABLE 9

| PCC w/v | VISCOSITY, cp | FLUID LOSS (ml) 1 min. | 10 min. | 30 min. |
|---|---|---|---|---|
| 0.5% | 90 | 12.0 | 31.5 | 55.5 |
| 1.0 | 200 | 12.0 | 31.5 | 56.0 |
| 1.5 | 320 | 15.0 | 45.0 | 80.0 |
| 2.0 | 1000 | 16.5 | 46.0 | 84.0 |

In the range 0.5 to 1.5% w/v, the viscosity of a highly dispersed PCC preparation is approximately linear with particulate concentration. PCC has a tendency to form zerogels at solids concentrations in excess of about 2.0% w/v. The deviation from a linear solids/viscosity relationship beginning in this region is probably a consequence of nonlinear particle/particle interaction. The filtration rates are relatively independent of concentrations below 1% w/v and appear to increase at higher concentrations for the 100 psi pressure used.

EXAMPLE 7

Effect of HC-S Concentration Upon PCC Filtration Control

A 30% w/w HC was diluted to 5% w/v and made 0.1N in NaOH. The solution was partially saponified by reaction overnight at 75° C. Upon cooling a loose gel had formed which was easily stirred and poured. A sufficient amount of the 5% gel was added to a PCC suspension prepared from an alkaline converted pulp which contained no HC or HC-S to make a dispersed mixture 1% w/v in PCC (the nonvolatile cellulose content is not corrected for inorganic ash content) at three different HC-S concentrations. The slurries were then homogenized by blending at high speed in a Waring blender for several minutes. The resulting PCC dispersions were slightly alkaline having pH 7.8. The viscosity was measured using a Brookfield viscometer model LVF with spindle #3 at 60 rpm and 23° C. The fluid loss control test was the standard A.P.I. method. The results are summarized in Table 10.

TABLE 10

| HC-S IN 1% w/v PCC | VISCOSITY cps | FILTRATE VOLUME (ml) 1 MIN. | 10 MIN. | 30 MIN. |
|---|---|---|---|---|
| 0% | 200 | 12.0 | 31.5 | 56.0 |
| 0.5 | 220 | 7.0 | 19.5* | 32.0 |
| 1.0 | 270 | 6.5 | 16.5 | 26.0 |
| 1.5 | 330 | 5.5 | 13.5* | 21.5 |
| 2% HC-S No PCC | — | | no control | |

*At 11 Minutes rather than 10 min.

Saponified HC-S appears to have a major synergistic effect on fluid loss control by PCC, approximately halving the filtration rate of a 1% PCC dispersion at an equivalent solids concentration. Further improvement is observed upon increasing the HC-S/PCC ratio. The 1.5 ratio nearly approximates the distribution of soluble to particulate matter resulting from the high temperature, alkaline conversion of beet pulp. These results suggest that a HC/PCC homogenate (SAP) directly resulting from the high pH thermomechanical treatment of beet pulp, as taught for example in Example 8 of U.S. Ser. No. 414,931, may be especially useful as both a rheology and fluid loss control fluid for drilling fluids. In contrast to a high temperature saponified HC-S, temperature saponified HC-S used in this example appears to partially contribute to the viscosity.

EXAMPLE 8

Rheological Performance of Alkaline Converted Beet Pulp in Brine or Water as a Drilling Fluid Composition An alkaline converted beet pulp (SAP) was prepared as in Example 8 of Ser. No. 414,931 by reaction of pulp at 163° C. in the presence of 0.2N NaOH for 57 seconds. The resulting puree contained approximately 40% particulate and 60% soluble pulp solids. The pH of the converted pulp slurry was 11.8 and it appeared indefinitely stable to storage at room temperature in this state. The following experiments were performed using a 1% w/v particulate PCC suspension containing 1.5% w/v saponified hemicellulosics HC-S and other indicated ingredients. The PCC/HC-S suspensions containing 5 drops of antifoam (Calgon CL-371) were blended for 5 minutes in a Waring blender at high speed, cooled to room temperature, and degassed by vacuum aspiration before instrumental examination. The results of a basic battery of tests designed to ascertain suitability for use as a proposed drilling fluid are found in Table 11. A Fann model 35 viscometer was used for viscosity measurements and the Baroid, model 301 filtration equipment used for fluid loss control measurements.

The data indicates good compatibility with representative drilled clay solids and common fluid loss control agents. Table 12 presents the data from an identical set of experiments in saturated NaCl brine. Remarkably, the results indicate that both viscosity and filtration control of SAP homogenates actually appear to improve in saturated brines. As with fresh water dispersions, the addition of representative drilled clay solids at low concentration improved filtration control, with the exception of $CaCO_3$. Bentonite was less effective and starch unaffected by brine as expected.

EXAMPLE 9

Rheological Properties and Filtration Control in Saturated Brine of Alkaline Converted Pulp, SAP The alkaline converted pulp SAP described in foregoing Example 8 was used and similar experimental protocols employed. Table 13 presents the basic battery of drilling fluid tests for this example in saturated NaCl in which the concentration of SAP was varied. The weight ratio of the SAP is expressed based on a particulate PCC basis. The material also contains about 1.5 times the PCC content of HC-S solids. While the rheologic properties systematically decrease with decreasing concentration of alkaline pulp solids, the filtration control actually improves. An optimum appears to be

TABLE 11

| | 1% w/v PCC Basis, SAP IN WATER | | | | | |
|---|---|---|---|---|---|---|
| | NO ADDITIONS | 1.5% w/v Rev Dust[R] | 1.5% w/v Grundite[R] | 1.5% w/v $CaCO_3$ | 1.5% w/v Impermex[R] | 1% w/v Bentonite |
| RHEOLOGY | | | | | | |
| apparent viscosity, cps | 22.5 | 25 | 22.5 | 22 | 37.5 | 29 |
| 300 rpm Fann viscosity, cps | 34 | 34 | 30 | 29 | 45 | 40 |
| Plastic viscosity | 13 | 16 | 17 | 15 | 20 | 18 |
| Yield point, lb./100 ft$^2$ | 21 | 18 | 13 | 14 | 25 | 22 |
| 10 sec gel lb./100 ft$^2$ | 10 | 10 | 9 | 8 | 14 | 13 |
| FILTRATION CONTROL | | | | | | |
| Filtrate at 0.5 min., ml | 7 | 3.4 | 3 | 10.5 | 3.5 | 3 |
| Filtrate at 1.0 min., ml | 8.5 | 4 | 3.5 | 14 | 4.5 | 3.5 |
| Filtrate at 7.5 min., ml | 15.5 | 8.5 | 7.5 | 25.5 | 8.5 | 8.5 |
| Filtrate at 30 min., ml | 26.5 | 15.5 | 15 | 37 | 15.5 | 16.5 |
| Cake thickness | thin film | thin film | thin film | film | thin film | thin film |
| pH | 11.6 | 11.5 | 11.2 | 11.6 | 11.5 | 11.5 | reached in the vicinity of 0.75% w/v based upon the particulate PCC content. These formulations, especially

TABLE 12

| | 1% w/v PCC Basis, SAP IN BRINE | | | | | |
|---|---|---|---|---|---|---|
| | NO ADDITIONS | 1.5% w/v Rev Dust[R] | 1.5% w/v Starch | 1.5% w/v Grundite | 1.0% w/v $CaCO_3$ | 0.9% w/v Bentonite |
| RHEOLOGY | | | | | | |
| apparent viscosity, cps | 50.5 | 42.5 | 71 | 58.5 | 51.5 | 46.5 |
| 300 rpm Fann viscosity, cps | 78 | 74 | 54 | 94 | 78 | 73 |
| Plastic viscosity, cps | 23 | 21 | 34 | 23 | 25 | 20 |
| Yield point lb./100 ft$^2$ | 55 | 53 | 74 | 71 | 53 | 53 |
| 10 sec gel lb./100 ft$^2$ | 27 | 26 | 37 | 34 | 28 | 25 |
| pH | 10.8 | 10.8 | 10.8 | 10.8 | 10.9 | 10.8 |
| FILTRATION CONTROL | | | | | | |
| Filtrate at 30 sec., ml | 5 | 2 | 2.5 | 3 | 6 | 2 |
| Filtrate at 60 sec., ml | 6 | 2.5 | 3 | 3.5 | 8 | 2.5 |
| Filtrate at 7.5 min., ml | 11.5 | 6 | 6 | 6.5 | 19.5 | 6.5 |
| Filtrate at 30 min., ml | 21 | 11.5 | 10.5 | 11 | 38 | 14.5 |
| Spurt, ml | 4 | 1 | 2 | 2.5 | 4 | 1.5 |
| Cake thickness | thin film | thin film | thin film | thin film | film | thin film | those containing the representative drilled solids component, are expected to perform very well as a drilling fluid.

$CMC_{lv}$ alone provides adequate fluid loss control. The combination shows significant, synergistic improvement; however, there is an increase in viscosity above

TABLE 13

| | Effect of SAP Concentration upon Homogenate Properties in Saturated Brine | | | | | |
|---|---|---|---|---|---|---|
| | 1% w/v SAP | 1% w/v SAP 1.5% w/v Rev Dust$^R$ | 0.75% w/v SAP | 0.75% w/v SAP 1.5% w/v Rev Dust$^R$ | 0.5% w/v SAP | 0.5% w/v SAP 1.5% w/v Rev Dust$^R$ |
| RHEOLOGY | | | | | | |
| apparent Fann viscosity, cps | 50.5 | 47.5 | 27.5 | 28.5 | 15 | 14 |
| 300 rpm Fann viscosity, cps | 78 | 74 | 37 | 39 | 20 | 19 |
| Plastic viscosity, cps | 23 | 21 | 18 | 18 | 10 | 9 |
| Yield point, lb./100 ft$^2$ | 55 | 53 | 19 | 21 | 10 | 10 |
| 10 sec gel lb./100 ft$^2$ | 27 | 26 | 11 | 12 | 5 | 5 |
| pH | 10.8 | 10.8 | 10.8 | 10.8 | 10.9 | 10.9 |
| FILTRATION CONTROL | | | | | | |
| Filtrate at 30 sec, ml | 5 | 2 | 2.5 | 1 | 4 | 1 |
| Filtrate at 60 sec, ml | 6 | 2.5 | 3 | 1.5 | 5 | 1.5 |
| Filtrate at 7.5 min., ml | 11.5 | 6 | 6 | 3 | 10 | 3 |
| Filtrate at 30 min., ml | 21 | 11.5 | 11 | 6.5 | 20.5 | 7 |
| Spurt, ml | 4 | 1 | 2 | 0.5 | 3 | 0.5 |
| Cake Thickness | film | thin film | thin film | thin film | thin film | thin film |

EXAMPLE 10

Synergistic Fluid Loss Control by PCC and Low Viscosity CMC in Fresh Water

The particulate fraction from an acid converted beet pulp was bleached and mechanically classified to yield a PCC-BC preparation containing no HC. PCC-BC alone, CMC alone and a PCC-BC/CMC blend were homogenized for 5 minutes in a Waring blender at high speed, cooled to room temperature and degassed by vacuum aspiration. One drop of antifoam was added per 10 ml of homogenate to aid in degassing. The pH of the homogenate was adjusted to approximately 11. Table 14 presents the results of a basic test profile for rheology and filtration control of these samples. Neither PCC nor the additive effect expected. Similar synergistic results were observed for PCC and HC-S combinations in previous Example 7.

TABLE 14

| | Low Solids PCC/CMC Fresh Water Drilling Fluid | | |
|---|---|---|---|
| | 1% w/v $CMC_{lv}$ | 1% w/v PCC-BC | 0.5% w/v $CMC_{lv}$ 1% w/v PCC-BC |
| RHEOLOGY | | | |
| apparent Fann viscosity, cps | 6 | 21.5 | 30.5 |
| 300 rpm Fann viscosity, cps | 4 | 31 | 47 |
| PV, cps | 2 | 12 | 14 |
| YP, lb./100ft$^2$ | 2 | 19 | 33 |
| 10 sec. gel lb./100 ft$^2$ | 1 | 8 | 14 |
| pH | 11.2 | 11.0 | 11.0 |
| FILTRATION CONTROL | | | |
| Filtrate at 30 sec., ml | NO CONTROL | 10.0 | 2.0 |
| Filtrate at 60 sec., ml | | 15.5 | 3.0 |
| Filtrate at 7.5 min., ml | | 53.5 | 10.5 |
| Filtrate at 30 min., ml | | 116.0 | 22.5 |
| Spurt, ml | | 4.5 | 1.0 |
| Cake thickness | | 4/32 | 1/32 |

EXAMPLE 11

Effects of Saturated NaCl Brine and Other Additives Upon the Rheology and Filtration Properties of an Alkaline Converted Beet Pulp Homogenate Various mixtures of an alkaline converted beet pulp (SAP) and representative drilled clay substances, filtration control additives or calcium salts were prepared as follows. Approximately three drops of antifoam were added per 600 ml of the SAP suspensions containing 1% w/v PCC and 1.7% w/v saponified HC-S (reported solids are uncorrected for inorganic ash content). The mixtures were blended at high speed in a Waring blender for 5 minutes, the pH adjusted to 11.0, and the resulting homogenate blended an additional 10 minutes. The homogenized preparations were aged at 20° C. for 16 hr. at which time they were degassed by vacuum aspiration and the pH readjusted, if necessary, to 11.0. All pH readings in brine were corrected for Na+ concentration effects on the glass electrode of the pH meter. Table 15 compares the rheology and fluid loss profiles for various additives in a fresh water fluid versus Table 16 in saturated brine.

concentration of dissolved NaCl. The modest increases in viscosity observed for certain particulate additives above the control probably reflect intrinsic salt effects on the included particulate substance. This effect may contribute in an additive manner to the overall mixture rheology. Filtration control is actually improved in brine with the exception of the Grundite ™ mixture where the rate slightly increased. Differences in fluid loss ranging from 5 to 15 ml are thought to reflect to a first approximation the relative efficiency of small particle bridging or polymer interaction with the primary film of PCC/HC-S at the filtering surface.

TABLE 15

| | LOW SOLIDS WATER BASE FLUID CONTAINING 1% w/v PCC | | | | | | | | |
|---|---|---|---|---|---|---|---|---|---|
| | CONTROL | 0.5% w/v CMC$_{1v}$ | 1.5% w/v Rev Dust | 1.5% w/v Grundite | 1.5% w/v Impermex | 1% w/v Bentonite | 1% w/v CaCl$_2$ | 1.5% w/v Rev Dust 1.0% w/v CaCl$_2$ | 0.5% w.v CMC$_{1v}$ 1.0% w/v CaCl$_2$ |
| RHEOLOGY | | | | | | | | | |
| apparent viscosity, cp | 24 | 40 | 34.5 | 27 | 32 | 31 | 28 | 25 | 41.5 |
| 300 rmp viscosity, cp | 30 | 61 | 47 | 35 | 45 | 42 | 39 | 36 | 62 |
| Plactic viscosity, cp | 18 | 19 | 22 | 19 | 19 | 20 | 17 | 14 | 21 |
| Yield point, lb./100 ft$^2$ | 12 | 42 | 25 | 16 | 26 | 22 | 22 | 22 | 41 |
| 10 sec gel, lb./100 ft$^2$ | 8 | 15 | 13 | 11 | 14 | 12 | 12 | 10 | 23 |
| pH | 11.0 | 11.0 | 11.0 | 11.0 | 11.0 | 11.2 | 11.0 | 11.0 | 11.0 |
| FILTRATION CONTROL TEST | | | | | | | | | |
| Filtrate at 30 sec, ml | 7.5 | 2.5 | 2.5 | 0.5 | 3.0 | 2.0 | 4.0 | 0.5 | 2.0 |
| Filtrate at 60 sec, ml | 9.0 | 3.0 | 3.0 | 1.0 | 4.0 | 2.5 | 4.5 | 1.0 | 2.5 |
| Filtrate at 7.5 min, ml | 15.5 | 7.0 | 7.0 | 4.5 | 7.5 | 6.5 | 9.0 | 4.0 | 6.0 |
| Filtrate at 30 min, ml | 25.5 | 13.0 | 14.0 | 11.0 | 13.5 | 13.0 | 16.5 | 10.5 | 12.0 |
| Spurt, ml | 6.0 | 2.0 | 2.0 | 0.0 | 2.0 | 1.5 | 3.5 | 0.0 | 1.5 |
| Cake thickness | film | film | film | film | film | film | 1/32" | film | 1/32" |

The results of aging tests at 16 hr. indicate that with minor exceptions, the solution rheology of the various SAP homogenates is relatively insensitive to a high

TABLE 16

| | LOW SOLIDS BRINE BASE FLUID CONTAINING 1% w/v PCC | | | | | | | | |
|---|---|---|---|---|---|---|---|---|---|
| | CONTROL | 0.5% w/v CMC$_{1v}$ | 1.5% w/v Rev Dust | 1.5% w/v Grundite | 1.5% w/v Impermex | 1% w/v Bentonite | 1% w/v CaCl$_2$ | 1.5% w/v Rev Dust 1.0% w/v CaCl$_2$ | 0.5% w/v CMC$_{1v}$ 1.0% w/v CaCl$_2$ |
| RHEOLOGY | | | | | | | | | |
| apparent viscosity, cp | 31.5 | 41.5 | 40.5 | 40 | 41 | 33.5 | 28 | 30.5 | 46.5 |
| 300 rpm viscosity, cp | 44 | 59 | 54 | 55 | 57 | 45 | 38 | 41 | 58 |
| Plastic viscosity, cp | 19 | 24 | 27 | 25 | 25 | 22 | 18 | 20 | 35 |
| Yield point, lb./100 ft$^2$ | 25 | 35 | 27 | 34 | 32 | 23 | 20 | 21 | 23 |
| 10 sec gel, lb./100 ft$^2$ | 12 | 15 | 17 | 17 | 14 | 13 | 9 | 11 | 9 |
| pH | 11.0 | 11.0 | 11.0 | 11.0 | 11.0 | 11.0 | 11.0 | 11.0 | 11.0 |
| FILTRATION CONTROL TEST | | | | | | | | | |
| Filtrate at 30 sec, ml | 4.5 | 2.5 | 1.5 | 3.0 | 1.5 | 1.5 | 3.0 | 0.5 | 0.5 |
| Filtrate at 60 sec, ml | 5.0 | 3.0 | 2.0 | 4.0 | 2.0 | 2.0 | 4.0 | 1.0 | 1.5 |
| Filtrate at 7.5 min, ml | 9.0 | 5.0 | 4.0 | 7.5 | 3.0 | 4.0 | 7.0 | 3.0 | 2.5 |
| Filtrate at 30 min, ml | 15.5 | 9.0 | 8.0 | 12.5 | 5.5 | 8.0 | 11.5 | 6.5 | 5.5 |
| Spurt, ml | 4.0 | 2.0 | 1.0 | 2.0 | 1.0 | 1.0 | 2.0 | 0.0 | 0.0 |
| Cake thickness | film | film | film | film | film | film | film | film | film |

EXAMPLE 12

200° F. Static Aging of Low Solids, Polymer Drilling Fluids Based upon Alkaline or Acid Converted Beet Pulp An alkaline converted beet pulp concentrate (SAP) was prepared by the high pH, high temperature reaction of rehydrated beet pulp pellets generally in accordance with Ser. No. 414,931. The preparation contained 1.9% w/v cellulosic, particulate matter and approximately 3.2% w/v non-volatile soluble matter which is predominantly hemicellulosic solids. Reported nonvolatile solids were uncorrected for inorganic ash content. SAP was diluted with water or saturated NaCl brine to yield an uncorrected particulate cellulose concentration of 1% w/v. After addition of other additives and sufficient NaCl to reach saturation for the brine mixtures, the pH was adjusted to either 9.0 or 11.0 and the mixture blended for 15 minutes at high speed in a Waring blender. The pH was again adjusted, if needed, and the homogenate placed in a stainless steel vessel for static incubation at 200° F. for 16 hr. The cylinders were not degassed and contained a head space volume approximately equal to that of their liquid contents. After incubation the contents were cooled, blended at low speed for 2-5 minutes to disperse any clumped matter, the pH adjusted if necessary and the homogenate degassed by vacuum aspiration. Table 17 summarizes the rheology and fluid loss profiles.

A similar procedure was used to investigate acid converted pulp prepared generally in accordance with Example 1 of Ser. No. 414,931. Effects of various polymers which are thought to be more temperature stable than the hemicellulosics endogeneous to beet pulp were investigated. PSS, PVS, PA, PVA represent low to medium viscosity grades of sodium polystyrene sulfonate, sodium polyvinyl sulfonate, sodium polyacrylate and polyvinyl alcohol, respectively. CMC is a low viscosity sodium carboxymethyl cellulose. None of the above polymer preparations alone at the indicated concentration display significant fluid loss control or viscosity. Grundite ™ was employed as a representative drilled clay solids at 1% w/v. Grundite alone shows little, if any, filtration control. Tables 18 and 19 review the results.

As can be seen from Table 17, alkaline converted beet pulp can form the basis of a low solids drilling fluid which functions well in fresh water or saturated brines. Fluid loss control is markedly improved by incorporation of typical drilled clay solids which are an endogeneous component of drilling fluids. At the very high pH range of 10-11, the hemicelluloses are slowly degraded at 200° F. and the filtration control correspondingly diminishes. At pH 9 and below, however, the degradation is significantly reduced and the alkaline converted pulp can likely be used satisfactorily as a base fluid at temperatures up to 225° F. to 250° F.

Tables 18 and 19 demonstrate that a number of anionic polymers interact synergistically with the PCC to improve filtration control. These polymers are more temperature tolerant and can be used to supplement an alkaline converted pulp, SAP-based, system when used at temperatures exceeding about 250° F. The synthetic polymer-supplemented fluids are limited by the intrinsic thermal stability of the added polymers which is in the range of 300° F. to 350° F. for the systems used in this example. The incorporation of representative drilled clay solids also improves fluid loss control. Each of the foregoing polymers appear to act synergistically with PCC in the improvement of properties desirable in drilling fluids.

TABLE 17

200° F. STATIC AGING FOR FLUIDS BASED ON ALKALINE CONVERTED PULP

|  | 1% w/v SAP WATER — | 1% w/v SAP BRINE — | 1% w/v SAP WATER — | 1% w/v SAP BRINE — | 1% w/v SAP WATER 1% w/v Grundite | 1% w/v SAP BRINE 1% w/v Grundite |
|---|---|---|---|---|---|---|
| RHEOLOGY | | | | | | |
| Viscosity, apparent | 33 | 34 | 26 | 21.5 | 42 | 36 |
| Viscosity 300 rpm, cp | 46 | 48 | 37 | 37 | 64 | 48 |
| Plastic viscosity, cp | 20 | 20 | 15 | 16 | 20 | 24 |
| Yield point, lb./100 ft$^2$ | 26 | 28 | 22 | 21 | 44 | 24 |
| 10 sec gel, lb./100 ft$^2$ | 14 | 15 | 11 | 9 | 20 | 15 |
| pH | 9.0 | 9.0 | 11.0 | 11.0 | 9.0 | 9.0 |
| FILTRATION CONTROL | | | | | | |
| Filtrate at 30 sec, ml | 7.5 | 6.0 | 12.0 | 15.0 | 2.0 | 1.0 |
| Filtrate at 60 sec, ml | 10.0 | 7.5 | 16.0 | 22.0 | 2.5 | 1.5 |
| Filtrate at 7.5 min, ml | 23.0 | 12.0 | 40.5 | 61.5 | 6.5 | 4.0 |
| Filtrate at 30 min, ml | 45.0 | 25.0 | 76.0 | 128.0 | 14.0 | 8.0 |
| Spurt | 5.0 | 4.5 | 8.0 | 8.0 | 1.5 | 0.5 |
| Cake Thickness | film | film | 3/32" | ⅛" | film | film |

TABLE 18

200° F. STATIC AGING FOR FLUIDS BASED ON CRUDE ACID CONVERTED PRESS CAKE

|  | 0.5% w/v WATER — | 0.5% w/v BRINE — | WATER 1% w/v Grundite | 0.5% w/v PCC 1% w/v Grundite | 0.5% w/v PCC 0.5% w/v CMC | 0.5% w/v PCC 0.5% w/v CMC | 0.5% w/v PCC 0.5% w/v PVA | 0.5% w/v PCC 0.5% w/v PVA |
|---|---|---|---|---|---|---|---|---|
| RHEOLOGY | | | | | | | | |
| Viscosity apparent, cp | 11 | 13.5 | 11.5 | 15.5 | 23 | 26 | 11.5 | 16 |
| Viscosity @ 300 rpm, cp | 15 | 17 | 14 | 21 | 34 | 36 | 16 | 21 |
| Plastic viscosity, cp | 7 | 10 | 7 | 10 | 12 | 16 | 7 | 11 |

TABLE 18-continued

200° F. STATIC AGING FOR FLUIDS BASED ON CRUDE ACID CONVERTED PRESS CAKE

| | 0.5% w/v WATER — | 0.5% w/v BRINE — | WATER 1% w/v Grundite | 0.5% w/v PCC 1% w/v Grundite | 0.5% w/v PCC 0.5% w/v CMC | 0.5% w/v PCC 0.5% w/v CMC | 0.5% w/v PCC 0.5% w/v PVA | 0.5% w/v PCC 0.5% w/v PVA |
|---|---|---|---|---|---|---|---|---|
| Yield point, lb./100 ft$^2$ | 8 | 7 | 7 | 11 | 22 | 20 | 9 | 10 |
| 10 sec gel, lb./100 ft$^2$ | 3 | 4 | 3 | 5 | 7 | 8 | 3 | 5 |
| pH | 9.0 | 9.0 | 9.0 | 9.0 | 9.0 | 9.0 | 9.0 | 9.0 |
| FILTRATION CONTROL TEST | | | | | | | | |
| Filtrate at 30 sec, ml | 9.0 | 6.5 | 2.0 | 1.5 | 0.5 | 0.5 | 9.5 | 8.0 |
| Filtrate at 60 sec, ml | 12.0 | 8.5 | 3.0 | 2.5 | 1.5 | 1.5 | 12.5 | 8.5 |
| Filtrate at 7.5 min, ml | 30.0 | 22.5 | 10.5 | 9.5 | 6.5 | 4.5 | 29.5 | — |
| Filtrate at 30 min, ml | 63.5 | 44.5 | 26.0 | 23.5 | 16.0 | 10.5 | 56.5 | 47.5 |
| Spurt, ml | 6.0 | 4.5 | 1.0 | 0.5 | 0.0 | 0.0 | 6.5 | 5.5 |
| Cake thickness | 1/32" | film | film | film | 1/16" | 1/16" | film | film |

TABLE 19

200° F. STATIC AGING FOR LOW SOLIDS POLYMER FLUIDS CONTAINING DRILLING CLAY SOLIDS

| | 0.5% w/v PCC WATER 1% w/v Grundite 1% w/v PSS | 0.5% w/v PCC BRINE 1% w/v Grundite 1% w/v PSS | 0.5% w/v PCC WATER 1% w/v Grundite 1% w/v PVS | 0.5% w/v PCC BRINE 1% w/v Grundite 1% w/v PVS | 0.5% w/v PCC WATER 1% w/v Grundite 1% w/v PA | 0.5% w/v PCC BRINE 1% w/v Grundite 1% w/v PA | 0.5% w/v PCC WATER 1% w/v Grundite 1/5% w/v PVA | 0.5% w/v PCC BRINE 1% w/v Grundite 1.5% w/v PVA |
|---|---|---|---|---|---|---|---|---|
| RHEOLOGY | | | | | | | | |
| Viscosity apparent, cp | 13 | 15.5 | 9 | 13 | 11 | 14.5 | 11.5 | 15 |
| Viscosity @ 300 rpm, cp | 17 | 20 | 12 | 17 | 15 | 19 | 14 | 20 |
| Plastic viscosity, cp | 9 | 11 | 6 | 9 | 7 | 10 | 7 | 10 |
| Yield point, lb./100 ft$^2$ | 8 | 9 | 6 | 8 | 8 | 9 | 7 | 10 |
| 10 sec gel, lb./100 ft$^2$ | 4 | 5 | 2 | 4 | 3 | 5 | 3 | 5 |
| pH | 9.0 | 9.0 | 9.0 | 9.0 | 9.0 | 9.0 | 9.0 | 9.0 |
| FILTRATION CONTROL TEST | | | | | | | | |
| Filtrate at 30 sec, ml | 3.0 | 5.5 | 4.5 | 0.5 | 5.0 | 1.0 | 1.5 | 1.5 |
| Filtrate at 60 sec, ml | 4.0 | 7.0 | 6.5 | 1.0 | 7.0 | 2.0 | 2.0 | 2.5 |
| Filtrate at 7.5 min, ml | 10.5 | 10.5 | 14.5 | 5.5 | 23.0 | 5.5 | 5.5 | 9.5 |
| Filtrate at 30 min, ml | 21.0 | 16.5 | 24.5 | 15.5 | 58.0 | 13.0 | 11.0 | 23.5 |
| Spurt, ml | 2.0 | 4.0 | 2.5 | 0.0 | 3.0 | 0.0 | 1.0 | 0.5 |
| Cake thickness | film | film | film | film | ¼" | film | film | film |

EXAMPLE 13

High Temperature Drilling Fluid Compositions Based upon PCC

PCC homogenates of an acid converted press cake containing high temperature fluid loss control additives were prepared by homogenization at high speed in a Waring blender for 15 minutes. To the homogenates were added 4 drops of antifoam per 600 ml; the pH was adjusted to 9.0 after cooling to room temperature. The 600 ml aliquots were static incubated at 300° F. or 350° F. for 16 hours in stainless steel cylinders containing a headspace to liquid volume ratio of 1. No attempt was made to degas or remove oxygen. Lignite was a commercial, ground API grade. AMPS is a high molecular weight homopolymer of 2-acrylamido-2-methyl propanesulfonic acid obtained from Lubrizol Corp., Cleveland, Ohio. Miltemp TM is a proprietary sulfonated polystyrene copolymer product of Milchem Company, Houston, Tex. After incubation the contents of the bombs were cooled to room temperature, the pH adjusted to 9.0 and the mixtures blended for 5 minutes with two drops of antifoam. Rheology and fluid loss control profiles were obtained as described in earlier examples. The results are described in Table 20.

The results indicate that PCC has good compatibility with lignite, AMPS and Miltemp TM at 300° F. For example, it is believed that lignite can control filtration and PCC, the rheology. In the case of AMPS, the polymer contributes to the rheology and provides a synergistic filtration control effect. AMPS alone does not display any fluid loss control. Miltemp TM acts synergistically with PCC to control fluid loss but it is believed not to contribute to the rheology of the mixture.

the pH was adjusted to 9.0. The rheology and fluid loss characteristics were determined as outlined in previous examples. Static aging of the preparations at room tem-

TABLE 20

PCC BASED HIGH TEMPERATURE FLUIDS

|  | 2% w/v Lignite 1.3% w/v PCC 16 hr @ 68° F. | 2% w/v Lignite 1.3% w/v PCC 16 hr @ 300° F. | 2% w/v Lignite — 16 hr @ 300° F. | 1% w/v AMPS 1% w/v Grundite 1% w/v PCC 4 hr @ 68° F. | 1% w/v AMPS 1% w/v Grundite 1% w/v PCC 16 hr @ 350° F. |
|---|---|---|---|---|---|
| RHEOLOGY | | | | | |
| apparent viscosity, cp | 21.5 | 20.5 | NO | 36.5 | 22.5 |
| Fann Viscosity @ 300 rmp, cp | 29.0 | 31 | VISCOSITY | 55.5 | 32 |
| Plastic viscosity, cp | 14 | 10 | | 21.5 | 13 |
| Yield point, lb./100 ft² | 15 | 21 | | 34.0 | 19 |
| 10 sec gel, lb./100 ft² | 6 | 7 | | — | — |
| pH | 9.0 | 9.0 | 9.0 | 9.0 | 9.0 |
| FILTRATION CONTROL | | | | | |
| Filtrate at 30 sec, ml | 3.5 | 4.5 | 5.0 | 3.0 | 1.5 |
| Filtrate at 60 sec, ml | 4.5 | 5.5 | 7.0 | 3.5 | 2.5 |
| Filtrate at 7.5 min, ml | 10.5 | 10.5 | 15.0 | 7.5 | 7.0 |
| Filtrate at 30 min, ml | 21.5 | 26.0 | 27.5 | Est 15.0 | Est 14.0 |
| Spurt, ml | 2.5 | 3.5 | 3.0 | 2.5 | 1.0 |
| Cake thickness | film | film | film | film | film |

|  | 1% w/v AMPS 1% w/v Grundite — 16 hr @ 300° F. | * 1% w/v Miltemp 1% w/v Grundite 1% w/v PCC 4 hr @ 68° F. | * 1% w/v Miltemp 1% w/v Grundite 1% w/v PCC 16 hr @ 300° F. | * 1% w/v Miltemp 1% w/v Grundite — 16 hr @ 300° F. |
|---|---|---|---|---|
| RHEOLOGY | | | | |
| apparent viscosity, cp | : | 18 | 18.5 | : |
| Fann Viscosity @ rpm, cp | : | 24 | 25 | : |
| Plastic viscosity, cp | TO | 12 | 12 | TO |
| Yield point, lb./100 ft² | DO | 12 | 13 | DO |
| 10 sec gel, lb./100 ft² | AT | 6 | 5 | AT |
| pH | SLT | 9.0 | 9.0 | SLT |
| FILTRATION CONTROL | | | | |
| Filtrate at 30 sec, ml | : | NEG. | 1.5 | : |
| Filtrate at 60 sec, ml | : | 0.5 | 2.5 | : |
| Filtrate at 7.5 min, ml | : | 3.0 | 8.5 | : |
| Filtrate at 30 min, ml | : | 8.5 | 18.5 | : |
| Spurt, ml | : | 0 | 9.5 | : |
| Cake thickness | : | film | film | : |

EXAMPLE 14

Low Solids, Potassium Inhibited Drilling Fluid Based Upon Alkaline Converted Pulp An alkaline converted beet pulp (SAP) fluid was prepared containing 1.0% w/v particulate PCC and 1.8% w/v saponified HC-S solids (nonvolatile solids are uncorrected for inorganic ash content). The preparation was homogenized on a Manton-Gaulin Model 15 homogenizer at 3000 psi (primary stage) to a limiting Fann viscosity at 600 rpm. The homogenate was diluted 1:1 with tap water, specified ingredients added (representative drilled clay solids and KCl) and the mixture further homogenized in a Waring blender for 5 minutes. Five drops of antifoam were used per 600 ml of the homogenate to control foaming. After mixing in the blender, the homogenates were degassed on a vacuum aspirator and perature for 24 hours had virtually no effect upon the properties other than control of A.P.I. fluid loss which improved slightly for the composition containing Rev Dust ™. Table 21 summarizes the results.

The Fann rheology profile is insensitive to 3% w/v KCl. The intrinsic filtration control believed to be provided by the interaction of the PCC film and HC-S appears to be only slightly affected by KCl. The addition of representative drilled solids greatly improves control of fluid loss as observed in earlier examples for saturated salt brines. It is believed that the suspended clays provide a sufficient quantity of small particles that a portion of the colloidal clays plug the PCC base film interstices. HC-S is believed to be interactive with these clays to further decrease fluid permeability across the composite film.

TABLE 21

| COMPOSITION | 0.9% w/v HC-S<br>0.5% w/v PCC<br>—<br>— | 0.9% w/v HC-S<br>0.5% w/v PCC<br>3% w/v KCl<br>— | 0.9% w/v HC-S<br>0.5% w/v PCC<br>3% w/v KCl<br>1% w/v Grundite ™ | 0.9% w/v HC-S<br>0.5% w/v PCC<br>3% w/v KCl<br>1% w/v Rev Dust ™ | 0.9% w/v HC-S<br>0.5% w/v PCC<br>6% w/v KCl<br>— |
|---|---|---|---|---|---|
| RHEOLOGY | | | | | |
| apparent rpm, cp | 10.5 | 9.8 | 10.0 | 11.5 | 8.5 |
| Fann 300 rpm, cp | 15.5 | 14.5 | 14.0 | 15.5 | 13.5 |
| Plastic viscosity, cp | 5.5 | 5.0 | 6.0 | 5.5 | 5.5 |
| YP, lb./100 ft$^2$ | 10.0 | 9.5 | 8.0 | 10.0 | 8.0 |
| 10 sec. gel, lb./100 ft$^2$ | 3.5 | 2.5 | 3.0 | 3.0 | 3.0 |
| pH | 9.1 | 9.1 | 9.1 | 9.1 | 9.1 |
| FILTRATION CONTROL | | | | | |
| Filtrate @ 30 sec., ml | 7.0 | 7.5 | 2.0 | 2.0 | 8.0 |
| Filtrate @ 60 sec., ml | 8.5 | 9.0 | 2.5 | 2.5 | 10.5 |
| Filtrate @ 7.5 min., ml | 15.0 | 16.0 | 7.5 | 7.25 | 18.5 |
| Est. API Filtrate @ 30 min., ml | 30.0 | 32.0 | 15.0 | 14.5 | 37.0 |
| Spurt, ml | 5.5 | 6.0 | 1.5 | 1.5 | 5.5 |
| Cake thickness | film | film | film | film | film |

EXAMPLE 15

HC Beneficiated Bentonite in Salt Water

Dispersed fresh water preparations of bentonite clays undergo flocculation and later aggregation in the presence of increasing salt concentrations. Flocculation increases gel strength and greatly reduces fluid loss control while aggregation decreases both gel strength and fluid loss control. The time and concentration dependence of bentonite based drilling fluids in brines make control of rheology difficult. Certain polymers such as polyanionic celluloses and CMC have been found to improve fluid loss control characteristics of aggregated clays. Furthermore, in some instances, these polymers are believed to reduce aggregative interactions of both flocculated and dispersed clays. It has now been discovered that the hemicellulose derived from converted sugar beet pulp in an alkaline environment acts in a manner similar to CMC and imparts beneficial properties to bentonitic clays in salty water or brines.

A prehydrated, fresh water bentonite was prepared by aging 100 g bentonite in 3.5 liters of tap water overnight (10 lbs./bbl or 2.85% w/v). The prehydrated bentonite mixture was divided into five 700 ml aliquots and specified amounts of CMC$_{1\nu}$ or HC added. The HC used in this example was derived from an acid converted beet pulp and had been concentrated to 30% solids w/w (the nonvolatile solids are uncorrected for ash content). As isolated from an acid converted pulp, the pectin component is highly acetylated on the secondary hydroxyl functionality of the pyranose moiety and the uronic acid exists predominantly as the methyl ester. The mixtures were allowed to stand at room temperature for 3 hours at an alkaline pH of 8-11 to saponify the HC. After the saponification reaction was substantially complete as indicated by a stable pH reading, 35 g of NaCl was added to each aliquot and the slurry well mixed. The mixtures were then static aged at room temperature for 24 hours and the Fann rheology and fluid loss characteristics determined. Table 22 summarizes the results.

HC-S improves the gel strength and filtration control characteristics of salty bentonite suspensions in a manner similar to CMC. The improvement in fluid loss by HC-S displays a semilogarithmic concentration dependence and, upon extrapolation to the CMC$_{1\nu}$ result, HC appears to be approximately 20% as effective as CMC$_{1\nu}$ under the conditions of this example on a unit weight "as is" basis.

TABLE 22

Effect of HC and CMC Upon a Bentonite Suspension in 5% w/v NaCl

| | Control | 11.6 ml HC (3.5 g)* | 17.5 ml HC (5.25 g)* | 33.3 ml HC (10.0 g)* | CMC$_{1\nu}$ (4.0 g)* |
|---|---|---|---|---|---|
| RHEOLOGY | | | | | |
| apparent rpm, cp | 8.5 | 11.5 | 11.0 | 11.0 | 13.0 |
| Fann 300 rpm, cp | 12.0 | 18.0 | 16.0 | 14.0 | 16.0 |
| Plastic Visc., cp | 5.0 | 5.0 | 6.0 | 8.0 | 6.0 |
| YP, lb./100 ft$^2$ | 7.0 | 13.0 | 10.0 | 6.0 | 10.0 |
| 10 sec. gel, lb./100 ft$^2$ | 3.0 | 10.0 | 8.0 | 5.0 | 8.0 |
| pH | 9.3 | 9.3 | 9.3 | 9.3 | 9.3 |
| FILTRATION CONTROL | | | | | |
| Filtrate @ 30 sec., ml | 9.5 | 6.5 | 5.5 | 3.5 | 1.0 |
| Filtrate @ 60 sec., ml | 13.0 | 9.0 | 7.5 | 5.0 | 2.0 |
| Filtrate @ 7.5 min., ml | 35.5 | 24.0 | 20.0 | 13.5 | 5.5 |
| Est. API Filtrate @ 30 min., ml | 70.0 | 48.0 | 40.0 | 27.0 | 11.0 |
| Spurt, ml | 5.0 | 4.0 | 3.5 | 2.0 | 0.0 |
| Cake thickness | 1/16" | 1/16" | 1/32" | 1/32" | film |

*Amount as dry weight added per 700 ml of base fluid.

EXAMPLE 16

Use of PCC to Suspend Weighting Agents for High Density Drilling, Completion or Workover Fluids Medium density weighted fluids were prepared by blending various amounts of a crude acid converted pulp press cake with an A.P.I. commercial grade of barite and water or saturated NaCl. PCC concentrations are expressed as % total cellulosic solids based upon the initial fluid volume or weight prior to barite addition. The volumetric perturbation after barite addition was approximately 40%. The PCC concentrations employed ranged twofold from 0.75% to 1.5% w/v. The mixtures were homogenized in a Waring blender at high speed for six minutes, emptied into a covered 600 ml Griffin beaker and allowed to stand at room temperature for four days. Table 23 summarizes the compositional specifications and results.

A slight concentration dependence is indicated, but a 1% w/v PCC gives a final suspended barite bed volume of about 83% of the total homogenate volume. This is in contrast to the gravity packed barite control without PCC where the bed volume was only 33% of the total. There is no apparent difference between brine or water based suspensions. The PCC expanded barite homogenates did not give any indication of a significant sedimentation gradient or compacted bed. It appears that the suspended barite bed contracts in a homogeneous manner until interparticle compressive forces from the particulate suspending agent balance the gravitational forces upon the weighting agent particles. The relatively high experimental error ±10% indicated by data scatter in the measured densities is thought to be due to volumetric perturbation arising from air entrainment in the homogenates. Normally the weighted brines would be about 10% more dense than water but due to a propensity to foam and entrain some air they were about the same density as the water based system. In the case of the control where no air was entrained the density differential was as expected.

A high density weighted fluid was prepared by blending to homogeneity 175 ml of a specified PCC homogenate with 332 g of a commercial hematite preparation in a overhead Brookfield mixer, Model L587. The mixtures contained 3 drops of antifoam. Aliquots of the mixed suspension were placed in graduated cylinders to the 100 ml mark and covered to prevent evaporation loss during long periods of standing. The height to diameter ratio of the mixture volume in the cylinder was approximately 14. The expected density of the hematite mixture was 17.5 lb./gal. The observed density, however, was slightly lower indicating a minor entrainment of air. The percentage bed contraction is calculated from the amount of free standing water above the expanded bed containing the weighting agent. The beds appeared to stabilize after standing 24 hours at room temperature. A clear PCC concentration dependence is shown by the results in Table 24. The effects of container geometry, density of the weighting agent and concentration of weighting particles make quantitative comparison with the barite example difficult. However, the results are qualitatively similar to the barite example; the 1% w/w PCC composition gives good suspension in highly weighted systems.

In order to demonstrate the thermal stability of the suspension, the 17 lb./gal. hematite experiment was repeated at 1% and 2% w/v PCC and static aged at 300° F. for 16 hr. The aged suspensions were homogenized for 5 minutes in a Waring blender at high speed and a 100 ml aliquot poured into the 100 ml graduated settling cylinder. The bed volumes were observed and recorded over a period of two weeks. The results are summarized in Table 25. The data indicates that there is very little change in suspension characteristics of PCC after high temperature exposure for 16 hr.

Addition of small amounts of attapulgite and sepiolite, typically 1 to 2% w/v, to a PCC homogenate improves the suspending properties of the membrane preparation. It is thought that this effect is the result of intermembrane bridging by the needle-like mineral particles. This could add a non-compressible structural component to the particulate membrane matrix suspending the high density weighting agent.

TABLE 23

| Suspension of Barite in Water and Brine | | | | | | | | | |
|---|---|---|---|---|---|---|---|---|---|
| Initial % PCC Solids w/v | Barite Solids, g | Volume Water ml | Volume NaCl Saturated Brine, ml | Added Press Cake @ 16.4%, g | Volume Final, ml | Suspended Bed Volume, ml | Free Water Volume, ml | % Bed Volume Suspended | Final Density lbs/gal |
| 1.5 | 325 | — | 350 | 68.0 | 495 | 425 | 70 | 86 | 13.6 |
| " | | 350 | — | 68.0 | 465 | 430 | 40 | 92 | 13.3 |
| 1.25 | 325 | — | 350 | 55.6 | 510 | 435 | 75 | 85 | 13.0 |
| " | | 350 | — | 55.6 | 455 | 400 | 55 | 88 | 13.3 |
| 1.0 | 325 | — | 350 | 43.8 | 520 | 435 | 85 | 84 | 12.5 |
| " | | 350 | — | 43.8 | 470 | 380 | 90 | 81 | 12.7 |
| 0.75 | 325 | — | 350 | 32.3 | 515 | 435 | 80 | 84 | 12.5 |
| " | | 350 | — | 32.3 | 455 | 370 | 120 | 81 | 12.9 |
| 0.00 | 325 | — | 350 | — | 437 | 150 | 287 | 34 | 14.0 |
| | | 350 | — | — | 430 | 140 | 290 | 32 | 13.0 |

TABLE 24

| Suspension of Hematite in Water | | | | | |
|---|---|---|---|---|---|
| Initial % w/v PCC in 175 ml homogenate | Final % PCC w/w | Final % PCC w/w | Hematite Solids, g | @ 3 hr. % Bed Contraction | @ 24 hr. % Bed Contraction |
| 2.5 | 1.82 | 0.86 | 332 | 2.0 | 9.8 |
| 2.0 | 1.46 | 0.69 | 332 | 3.4 | 12.2 |
| 1.5 | 1.09 | 0.52 | 332 | 8.1 | 10.5 |
| 1.0 | 0.73 | 0.345 | 332 | 13.5 | 14.6 |
| 0.5 | 0.36 | 0.17 | 332 | 23.0 | 24.7 |
| 0.0 | — | — | 332 | 47.8 | 47.1 |

TABLE 25

| Suspension of Hematite After 16 Hr. at 300° F. | | | | | | |
|---|---|---|---|---|---|---|
| Final % PCC w/v | Final % PCC w/w | @ 3 hr. | @ 48 hr. | @ 72 hr. | @ 96 hr. | @ 2 wks. |
| 1.46 | 1.38 | 2% | 11% | 11% | 12.5% | No change |

TABLE 25-continued

| | | Suspension of Hematite After 16 Hr. at 300° F. | | | | |
|---|---|---|---|---|---|---|
| Final % PCC w/v | Final % PCC w/w | @ 3 hr. | % Bed Contraction @ 48 hr. | @ 72 hr. | @ 96 hr. | @ 2 wks. |
| 0.73 | 0.69 | 12% | 24% | 26% | 28% | No change |

EXAMPLE 17

Low Solids Oil-in-Water PCC Emulsion

A 1% PCC w/v (nonvolatile cellulosic solids uncorrected for inorganic ash content) aqueous homogenate of an acid converted crude pulp press cake was prepared containing 3% Rev Dust ® as a representative drilled clay solid. The pH was adjusted to 11.3. A 10% v/v oil-in-water emulsion of this PCC homogenate was prepared by adding 44 ml diesel oil to a 400 ml aliquot of the homogenate containing 5 drops of a common liquid soap concentrate (linear alkylbenzene sulfonate) and blending at high speed in a Waring blender for 5 minutes. The control consisted of the PCC homogenate without detergent and diesel oil. Both samples were degassed by vacuum aspiration. The results of a basic battery of drilling mud tests are summarized in Table 26. Rheology and fluid loss control profiles were obtained as described before.

The oil and water PCC-mediated emulsion was stable and showed no observable segregation on standing for 2 months. The results indicate that a low solids, oil emulsion with reasonably good filtration control can be prepared from a PCC homogenate. In contrast to clay based systems, this fluid should have application in high temperature environments due to the excellent temperature stable rheology of PCC.

TABLE 26

| | CONTROL | OIL EMULSION |
|---|---|---|
| RHEOLOGY | | |
| 600 rpm Fann viscosity, cps | 22.5 | 30 |
| 300 rpm Fann viscosity, cps | 30 | 45 |
| Plastic viscosity, cps | 15 | 15 |
| Yield point, lb/100 ft$^2$ | 15 | 15 |
| 10 second gel, lb/100 ft$^2$ | 7 | — |
| pH | 11.3 | 11.3 |
| FILTRATION CONTROL | | |
| Filtrate at 30 sec, ml | 4.5 | 2.0 |
| Filtrate at 60 sec, ml | 6.5 | 3.5 |
| Filtrate at 7.5 min, ml | 20.5 | 11.0 |
| Filtrate at 30 min, ml | 47.0 | 21.5 |
| Cake thickness | — | Thin film |
| Spurt, ml | 2.5 | Under 1 |

EXAMPLE 18

Effect of Chrome Lignosulfonate and Ferrochrome Lignosulfonate on the Fluid Loss Properties of a PCC Homogenate A 1% w/v PCC homogenate (particle cellulose uncorrected for inorganic ash content) was prepared from the press cake of an acid converted beet pulp by blending for 15 minutes at high speed on a Waring blender. The homogenate was cooled to room temperature and the appropriate quantity of Rev Dust ™ and a commercial grade of either chrome lignosulfonate (CLS) or ferrochrome lignosulfonate (FLS) added to make the sample 1% w/v in drilled solids and 1% or 3% w/v in the designated lignosulfonate. The slurries were homogenized for 5 minutes, antifoam added, cooled to room temperature and the pH adjusted to 9.0. Each sample was static aged at 200° F. for 16 hr. After cooling to room temperature, each received a brief blending and the pH was readjusted to 9.0. Table 27 shows the results obtained using the standard A.P.I. low pressure filtration control test and Fann rheology profile.

PCC does not significantly interact with lignosulfonates to result in a change in its rheology. Control of fluid loss is improved, however, varying directly with increasing concentrations of lignosulfonates in the range they are commonly employed for controlling solids buildup.

TABLE 27

Effects of Lignosulfonates on Fluid Loss in a 1% PCC Homogenate Containing 1% w/v Drilled Solids

| | CONTROL | +1% w/v CLS | +3% w/v CLS | +1% w/v FLS | +3% w/v FLS |
|---|---|---|---|---|---|
| RHEOLOGY | | | | | |
| apparent viscosity, cps | 21.0 | 18.0 | 16.0 | 15.0 | 16.5 |
| Fann Viscosity @ rpm, cps | 31.0 | 27.0 | 23.0 | 20.0 | 23.0 |
| Plastic viscosity, cps | 11.0 | 9.0 | 9.0 | 10.0 | 10.0 |
| Yield point, lb./100 ft$^2$ | 20.0 | 18.0 | 14.0 | 10.0 | 13.0 |
| 10 sec gel, lb./100 ft$^2$ | 9.5 | 9.0 | 7.0 | 6.0 | 7.0 |
| pH | 9.0 | 9.0 | 9.0 | 9.0 | 9.0 |
| FILTRATION CONTROL | | | | | |
| Filtrate at 30 sec, ml | 3.0 | 2.5 | 3.0 | 3.0 | 2.5 |
| Filtrate at 60 sec, ml | 4.0 | 3.5 | 4.0 | 3.5 | 3.0 |
| Filtrate at 7.5 min, ml | 12.0 | 9.0 | 7.75 | 8.5 | 6.5 |
| Filtrate at 30 min, ml (Est.) | 24.0 | 18.0 | 15.5 | 17.0 | 11.0 |
| Spurt, ml | 2.0 | 1.5 | 2.0 | 2.5 | 2.0 |
| Cake thickness, inch | 1/16" | 1/16" | 1/16" | 1/16" | 1/16" |

EXAMPLE 19

Preparation of PCC from Citrus Pulp

PCC and related materials may also be obtained from other vegetable material in addition to sugar beets. Thus citrus pulps, Jerusalem artichoke pulps, and many other processed plant residues containing a high proportion of parenchymous matter may serve as sources of PCC. Most also comprise useful hemicellulose fractions as well. An especially promising source of PCC is citrus. It appears that PCC derived from citrus may also be useful in the preparation of drilling completion and workover fluids for oil and gas production.

Fifty lbs. of a commercial feed grade, pelletized grapfruit pulp was hydrated at 10% w/w pulp solids. Sufficient 50% w/w NaOH was added to make the slurry 0.1N NaOH with an initial pH of 12.1. The viscous slurry was passed through the tubular reactor assembly described in Ser. No. 414,931, at 165° C. The slurry was pumped at an appropriate rate to give a fifty second residence time. The superficial linear velocity across the exit orifice was approximately 1000 cm/second. The product was cooled and the distribution of nonvolatile solids obtained by partitioning and rinsing through a 200 mesh nylon cloth was 38% retained particulates and 62% soluble/colloidal, respectively.

The pH of the press juice was adjusted to 4.5 with HCl and two commercial pectinases, Klerzyme TM L-100 and Pectinol TM 60B, added to the hazy, brown colored solution at 1% v/v each. After several hours of incubation, the solution was centrifuged and analyzed by HPLC as in Example 6. Minor and approximately equal molar quantities of D-glucose and D-fructose were found in the supernatent, but no D-galacturonic acid. The glucose and fructose probably arise from hydrolysis of endogeneous sucrose. The pectates appear to be flocculated, colloidal precipitates which result from lime treatment of the pulp prior to drying. Any low molecular weight uronic acids generated during the hydrolytic enzyme treatment are probably co-flocculated and also sedimented during centrifugation. Useful hemicelluloses, in soluble form, are not easily isolated from citrus pulp which has been treated with lime.

The alkaline converted pulp residue was rinsed and classified by jet spraying against a 100 mesh screen onto a collector 200 mesh screen. In contrast to PCC obtained from sugar beets which almost totally passes a 100 mesh screen, the particulate dimensions of grapefruit pulp derived PCC are somewhat larger with 76% being retained on a 100 mesh screen and 24% recovered from the 200 mesh collector screen. The recovered PCC is easily bleached to a white cellulose pulp using conditions similar to those described in Examples 2-4. The bleached and classified PCC from citrus appears very similar to that from beet pulp regarding the rheology of a low solids homogenate and its film forming characteristics. Light microscopy indicates significantly more heterogeneity of membrane size than observed for beet PCC, however.

EXAMPLE 20

Relative Temperature Tolerance of PCC Obtained from Beet and Citrus Pulp

Bleached and classified samples of PCC prepared according to Examples 2-5 of Ser. No. 414,931 and foregoing Example 19 from beet and citrus pulps, respectively, were suspended in water and homogenized at high speed in a Waring blender for 15 minutes. The citrus homogenate was 1.5% w/v particulate PCC and the beet homogenate was 0.8% w/v particulate PCC, both uncorrected for inorganic ash content. The pH was adjusted to 9.0 for the beet PCC samples and to 10.0 for the citrus pulp homogenates. The homogenates were placed in high temperature/high pressure stainless steel incubation cells and degassed in situ by repetitive vacuum aspiration and nitrogen flushing. The cells were pressurized to 100 psi with nitrogen, sealed and subjected to static incubation at the indicated temperature for 16 hr. After incubation, the contents of the cell were cooled and examined. Standard A.P.I. rheology profiles were obtained with a Fann viscometer Model 35. The results are shown in Table 28. Ten minute gel strengths are identical to the 10 second gel strengths.

The homogenates are progressively degraded as the temperature increases beyond 160° C. Both PCC preparations behave similarly in that they are highly stable to temperatures up to approximately about 160° C. and then appear to undergo an irreversible thermal transformation between 160° C. and 190° C., losing 50 to 70% of their viscosity in 16 hr. as measured at 600 rpm in the Fann viscometer. The improved thermal stability of PCC in this example relative to that of Example 1 is thought to result from the absence of a highly oxidative environment.

TABLE 28

| | Comparative Thermal Stability of PCC From Beet and Citrus Pulp | | | | | | | |
|---|---|---|---|---|---|---|---|---|
| | CITRUS PULP PCC | | | | BEET PULP PCC | | | |
| RHEOLOGY PROFILE | 20° C. | 92° C. | 162° C. | 195° C. | 20° C. | 136° C. | 162° C. | 192° C. |
| apparent viscosity, cps | 30.5 | 28.0 | 28.5 | 9.5 | 19.0 | 19.5 | 18.0 | 8.5 |
| Fann 300 rpm viscosity, cps | 41.0 | 39.0 | 38.0 | 12.0 | 25.0 | 27.0 | 26.0 | 10.0 |
| PV, cps | 20.0 | 17 | 19.0 | 7.0 | 13.0 | 12.0 | 10.0 | 7.0 |
| YP, lb./100 ft$^2$ | 21.0 | 22.0 | 19.0 | 5.0 | 12.0 | 15.0 | 16.0 | 3.0 |
| 10 sec. gel, lb./100 ft$^2$ | 12.0 | 12.5 | 9.0 | 3.0 | 10.0 | 9.0 | 8.5 | 2.5 |
| Final pH | 10.0 | 8.3 | 6.8 | 5.0 | 9.0 | 7.1 | 6.8 | 4.1 |

EXAMPLE 21

Synergistic Interaction of Saponified Citrus Pectin with PCC from Citrus Pulp

A 2% w/w solution of a commercial grade of citrus pectin was saponified by heating to 65° C. with addition of sufficient alkali to maintain the pH greater than 10 during ester hydrolysis. The resulting polygalacturonic acid, PG, solution was used to make a 1% w/v suspension of bleached and classified PCC obtained from grapefruit pulp as in Example 19, containing 0.5% w/v PG. The suspension was homogenized for 15 minutes at high speed in a Waring blender, cooled to room temperature and the pH adjusted to 10. The rheology and filtration control profiles relative to PCC alone are found in Table 29.

These results indicate that PG acts synergistically with PCC to improve filtration control and increase viscosity. This suggests that homogenates of alkaline converted citrus pulps containing PG derived from endogeneous pectin can provide solution properties desirable in a base drilling fluid system. The pulps of most interest would be those which have not been subjected to liming or other polyvalent cation flocculation processes commonly used to aid in dewatering and drying.

TABLE 29

Comparative Properties of Citrus PCC/PG
Versus Citrus PCC Homogenate

|  | 1.0% w/v PCC (Control) | 1.0% w/v PCC 0.5% w/v PG | 0.5% w/v PG |
|---|---|---|---|
| RHEOLOGY | | | |
| apparent viscosity, cps | 16.0 | 26.5 | — |
| Fann 300 rpm viscosity, cps | 21.0 | 37.5 | — |
| P.V., cps | 11.0 | 15.5 | — |
| Y.P., lb./100 ft$^2$ | 10.0 | 22.0 | — |
| 10 sec. gel, lb./100 ft$^2$ | 10.0 | 11.0 | — |
| pH | 10.0 | 10.5 | 10.0 |
| FILTRATION CONTROL | | | |
| 30 sec. filtrate | 6.0 ml | 2.5 ml | NO |
| 60 sec. filtrate | 8.0 ml | 3.5 ml | CONTROL |
| 7.5 Min. filtrate | 27.0 ml | 10.5 ml | |
| Est. 30 min. filtrate | 54.0 ml | 21.0 ml | |
| Spurt | 4.0 ml | 1.5 ml | — |
| Cake | 1/16" | 1/16" | — |

EXAMPLE 22

Synergistic Interaction of Anionic Polymers with PCC Derived from Citrus Pulp

A 1% w/v homogenate of a bleached and classified PCC derived from grapefruit pulp was prepared by a single pass of the suspension through a 2-stage Model 15 Gaulin homogenizer at 5,000 psi. Various polymers were then added to the base homogenate and the pH adjusted, if necessary, to 10.0. Rheology profiles were obtained using the Fann viscometer Model 35 and fluid loss control according to the standard A.P.I. low pressure fluid loss test. The results are summarized in Table 30.

These results indicate a high degree of synergistic interaction of certain anionic polymers with PCC derived from citrus pulp. Both CMC and AMPS improve viscosity, gel strength and filtration control. CMC is an unusually effective adduct at relatively low concentrations for these purposes.

EXAMPLE 23

Preparation of Citrus Pulp Homogenates Useful In Oil and Gas Production/Recovery Wet citrus pulp from Valencia oranges containing rag, peel and seeds was diverted from the pulp line of a commercial citrus juice factory prior to lime addition. Approximately 110 lbs. of the pulp was blended and chopped in a modified food waste disposal unit to yield 30 gal. of a pale yellow slurry. Concentrated NaOH (50% w/w) was added at 40 ml/gal. of slurry. The slurry turned deep orange and had a measured pH of 11.5.

The alkaline citrus pulp was saponified in a tubular reactor at 165° C. in general accordance with Ser. No. 414,931 (abandoned), using a reactor residence time of approximately 80 seconds. The slurry was flashed to atmospheric pressure across an 0.25" diameter exit orifice giving a superficial linear velocity of 350 cm/sec. Upon cooling to room temperature, the reactor effluent slurry had a pH of 9.0 and formed a thick gel-like mass. The saponified pulp was diluted threefold, mixed and screened through a 20-mesh stage to remove minor amounts of fiber-like particles prior to homogenization.

TABLE 30

Comparative Effects of Anionic Polymers
In Rheology and Filtration Control Characteristics
of PCC Derived from Citrus Pulp

|  | 1% w/v PCC (Control) | 1% w/v PCC 0.25% w/v CMC$_{1v}$ | 1% w/v PCC 1% w/v CMC$_{1v}$ | 1% w/v PCC 1% w/v PSS | 1% w/v PCC 1% w/v AMPS |
|---|---|---|---|---|---|
| RHEOLOGY | | | | | |
| apparent viscosity, cps | 28.0 | 28.0 | 35.0 | 25.5 | 48.0 |
| Fann 300 rpm viscosity, cps | 34.0 | 44.0 | 51.0 | 34.0 | 72.0 |
| P.V., cps | 22.0 | 12.0 | 19.0 | 17.0 | 24.0 |
| Y.P., lb./100 ft$^2$ | 12.0 | 32.0 | 32.0 | 17.0 | 48.0 |
| 10 sec. gel, lb./100 ft$^2$ | 6.0 | 9.5 | 11.0 | 9.0 | 11.0 |
| pH | 10.0 | 10.0 | 10.0 | 10.0 | 10.0 |
| FILTRATION CONTROL | | | | | |
| 30 sec. filtrate | 5.0 ml | 1.5 ml | 1.0 ml | 3.5 ml | 2.5 ml |
| 60 sec. filtrate | 6.5 | 2.5 | 1.25 | 4.5 | 3.5 |
| 7.5 min. filtrate | 19.5 | 8.75 | 5.0 | 13.0 | 8.0 |
| Est. 30 min. filtrate | 39.0 | 17.5 | 10.0 | 26.0 | 16.0 |
| Spurt | 3.5 ml | 1.0 ml | 0.75 ml | 2.5 ml | 1.5 ml |
| Cake | 1/16" | 1/16" | thin film | thin film | thin film |

The resulting slurry was homogenized at low pressure on a Gaulin Model 15 homogenizer to give a thick amber concentrate with a plastic viscosity of 28 cps and a yield point of 62 lbs./100 ft$^2$. The 30 minute A.P.I. filtrate was 12.5 ml using the standard static low pressure test.

The above alkaline converted pulp homogenate was diluted a further 1.5 fold to give a nonvolatile solids content of 0.8% organic particulate matter (PCC) and 0.8% organic soluble matter (HC-S), both corrected for ash content. The homogenate was made saturated in NaCl by adding 34 g NaCl per 100 g of the homogenate. The homogenates were blended in a Waring blender for 5 minutes at high speed and cooled to room temperature before examination. The effect of starch and CMC upon rheology and filtration control before and after static aging for 17 hr. at 200° F. is found in Table 31.

TABLE 31

Effect of Fluid Loss Additives in NaCl Brine On Properties of an Alkaline Converted Citrus Pulp Homogenate Containing 0.8% PCC and 0.8% HC

|  | CONTROL IN BRINE | | +1% w/v Impermex ™ IN BRINE | | +0.1% w/v CMC$_{1\nu}$ IN BRINE | |
| --- | --- | --- | --- | --- | --- | --- |
|  | Before Aging | After Aging | Before Aging | After Aging | Before Aging | After Aging |
| RHEOLOGY PROFILE | | | | | | |
| apparent viscosity, cps | 28.0 | 27.5 | 36.5 | 37.5 | 45.0 | 45.0 |
| Fann 300 rpm viscosity, cps | 38.0 | 38.0 | 50.0 | 52.0 | 67.0 | 66.0 |
| Plastic Viscosity, cps | 18.0 | 17.0 | 23.0 | 25.5 | 23.0 | 24.0 |
| Yield Point, lbs./100 ft$^2$ | 20.0 | 21.0 | 27.0 | 26.5 | 44.0 | 42.0 |
| *pH: | 8.3 | 8.4 | 8.3 | 8.3 | 8.4 | 8.4 |
| FILTRATION CONTROL: | | | | | | |
| 30 Sec. Filtrate, ml | 2.5 | 2.5 | 1.0 | 0.5 | 1.5 | 1.5 |
| 60 Sec. Filtrate, ml | 3.5 | 4.0 | 1.5 | 1.0 | 2.5 | 2.5 |
| 7.5 Min. Filtrate, ml | 11.0 | 13.0 | 4.0 | 4.5 | 8.0 | 8.5 |
| 30 Min. Filtrate, ml | 24.5 | 28.0 | 8.0 | 9.5 | 17.0 | 18.5 |
| Spurt: (in ml.) | 1.5 | 1.0 | 0.5 | 0.0 | 0.5 | 0.5 |

*Apparent pH of glass electrode.

What is claimed is:

1. A method of drilling a well comprising circulating through the well being drilled a fluid comprising parenchymal cell cellulose.

2. The method of claim 1 wherein said fluid further comprises a polymer soluble in the fluid in an amount sufficient to improve the fluid loss control of said fluid.

3. The method of claim 2 wherein said polymer is selected from the group consisting of carboxyalkyl cellulose, anionic polymers, nonionic polymers and polymers derived from starch.

4. The method of claim 1 wherein said fluid further comprises hemicellulose in an amount sufficient to improve fluid loss control of said fluid.

5. The method of claim 4 wherein said hemicellulose is derived from alkaline saponification of a cellulosic material.

6. The method of claim 1 wherein said fluid further comprises clay in an amount sufficient to improve the fluid loss control of said fluid.

7. The method of claim 2 wherein said fluid further comprises clay in an amount sufficient to improve the fluid loss control of said fluid.

8. The method of claim 1 wherein said fluid further comprises one or more materials selected from the group consisting of weighting agent, clay, brine and fibrous cellulose.

9. A non-circulating well fluid comprising parenchymal cell cellulose.

10. The fluid of claim 9 further comprising one or more materials selected from the group consisting of anionic polymer, substantially nonionic polymer, polymer derived from starch, carboxyalkyl cellulose, weighting agent, clay, brine, fibrous cellulose and acid.

11. The fluid of claim 9 adapted for fracturing a subterranean formation.

12. The fluid of claim 9 adapted for use as a completion or workover fluid.

13. The fluid of claim 9 adapted for use as an acid stimulation fluid.

14. A process of improving or maintaining a well comprising placing into said well a fluid comprising parenchymal cell cellulose.

15. The method of claim 14 wherein said fluid further comprises one or more materials selected from the group consisting of anionic polymer, substantially nonionic polymer, polymer derived from starch, carboxyalkyl cellulose, weighting agent, clay, brine, fibrous cellulose and acid.

* * * * *